US010929750B2

United States Patent
Tomita et al.

(10) Patent No.: US 10,929,750 B2
(45) Date of Patent: Feb. 23, 2021

(54) INFORMATION PROCESSING APPARATUS, ISING DEVICE, AND METHOD FOR CONTROLLING INFORMATION PROCESSING APPARATUS

(71) Applicant: FUJITSU LIMITED, Kawasaki (JP)

(72) Inventors: Yasumoto Tomita, Kawasaki (JP); Hirotaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 938 days.

(21) Appl. No.: 15/610,718

(22) Filed: Jun. 1, 2017

(65) Prior Publication Data

US 2018/0005114 A1    Jan. 4, 2018

(30) Foreign Application Priority Data

Jul. 1, 2016    (JP) .............................. JP2016-131285

(51) Int. Cl.
    *G06N 3/08*      (2006.01)
    *G06N 3/04*      (2006.01)
    *G06N 3/063*      (2006.01)
    *G06F 1/28*      (2006.01)

(52) U.S. Cl.
    CPC ............... *G06N 3/08* (2013.01); *G06F 1/28* (2013.01); *G06N 3/04* (2013.01); *G06N 3/0472* (2013.01); *G06N 3/063* (2013.01)

(58) Field of Classification Search
    CPC ............ G06N 3/04; G06N 3/08; G06N 3/063; G06N 3/0472; G06N 99/00; G06F 1/28
    See application file for complete search history.

(56) References Cited

U.S. PATENT DOCUMENTS

| 5,293,457 | A | * | 3/1994 | Arima | .................... G06N 3/063 |
| | | | | | 706/34 |
| 2016/0065210 | A1 | * | 3/2016 | Yoshimura | ......... H03K 19/0002 |
| | | | | | 326/56 |
| 2017/0061326 | A1 | * | 3/2017 | Talathi | ................ G06K 9/4628 |
| 2017/0351949 | A1 | * | 12/2017 | Matsubara | ............ G06N 3/049 |

FOREIGN PATENT DOCUMENTS

| JP | 5-250346 | 9/1993 |
| JP | 8-272760 | 10/1996 |

OTHER PUBLICATIONS

Graf, Hans Peter, E. Sackinger, and Lawrence D. Jackel. "Recent developments of electronic neural nets in North America." Journal of VLSI signal processing systems for signal, image and video technology 6.1 (1993): 19-31. (Year: 1993).*

(Continued)

*Primary Examiner* — Kamran Afshar
*Assistant Examiner* — Randall K. Baldwin
(74) *Attorney, Agent, or Firm* — Fujitsu Patent Center

(57) ABSTRACT

In an information processing apparatus, a calculation circuit calculates energy values representing total energies of Ising devices that are set up with different noise widths, where the Ising devices have equal conditions about neuron-to-neuron connections. An exchange control circuit exchanges output values of neurons or noise widths, between first and second Ising devices having adjacent noise widths. This exchange takes place with an exchange probability based on a difference in the energy values between the first Ising device and the second Ising device.

7 Claims, 20 Drawing Sheets

INFORMATION PROCESSING APPARATUS 1

(56) References Cited

OTHER PUBLICATIONS

Roudi, Yasser, Joanna Tyrcha, and John Hertz. "Ising model for neural data: model quality and approximate methods for extracting functional connectivity." Physical Review E 79.5 (2009): 051915. (Year: 2009).*

Honkela, Timo, et al., eds. Artificial Neural Networks and Machine Learning-ICANN 2011: 21st International Conference on Artificial Neural Networks, Espoo, Finland, Jun. 14-17, 2011, Proceedings. vol. 6792. Springer, 2011: I-390. (Year: 2011).*

Sathasivam, Saratha. "Boltzmann machine and new activation function comparison." Applied Mathematical Sciences 5.78 (2011): 3853-3860. (Year: 2011).*

Ravanbakhsh, Siamak, Russell Greiner, and Brendan Frey. "Training restricted boltzmann machine by perturbation." arXiv preprint arXiv:1405.1436 (2014). (Year: 2014).*

Christian R. Schneider et al., "Analog CMOS Deterministic Boltzmann Circuits", IEEE Journal of Solid-State Circuits, vol. 28, No. 8, Aug. 1993, pp. 907-914 (8 pages).

A. DeGloria et al., "Efficient Implementation of the Boltzmann Machine Algorithm", IEEE Transactions of Neural Networks, vol. 4, No. 1, Jan. 1993, pp. 159-163 (5 pages).

Alessandro DeGloria et al., "Design and Performance Evaluation of a Parallel Architecture for the Boltzmann Machine", EUROMICRO 94: System Architecture and Integration, Proceedings of the 20th EUROMICRO Conference, Sep. 1994, pp. 629-636 (10 pages).

Koji Hukushima, "Front Line of Monte Carlo Method—Method for Integration with Throwing Dice-", Proceedings of Tutorial on Information Processing based on Probabilistic Algorithm, Nov. 2003 (12 pages).

Yuko Okamoto, "Generalized-Ensemble Algorithm", published in "Computer simulation of a living body course: to where can the structure of the protein be predicted?", the Chemical Frontier series, Dec. 2002 (20 pages).

* cited by examiner

FIG. 11

| Flgu | Flgd | Arbi | Selu | Seld |
|------|------|------|------|------|
| 1    | 0    | 0    | 1    | 0    |
| 0    | 1    | 0    | 0    | 1    |
| 0    | 0    | 0    | 0    | 0    |
| 1    | 1    | 1    | 1(0) | 0(1) |

FIG. 12

| Selu | Seld | $X_{qnew}$ |
|------|------|------------|
| 1    | 0    | $X_{q-1}$  |
| 0    | 1    | $X_{q+1}$  |
| 0    | 0    | $X_q$      |

FIG. 18

| Flg1 | Flg2 | ... | Flgq | Flg(q+1) | ... | Flg(N-1) | Sel1 | Sel2 | ... | Selq | Sel(q+1) | ... | SelN |
|---|---|---|---|---|---|---|---|---|---|---|---|---|---|
| 0 | 0 | ... | 0 | 0 | ... | 0 | 0 | 0 | ... | 0 | 0 | ... | 0 |
| 1 | d | ... | d | d | ... | d | 1 | 0 | ... | 0 | 0 | ... | 0 |
| 0 | 1 | ... | d | d | ... | d | 0 | 1 | ... | 0 | 0 | ... | 0 |
| 0 | 0 | ... | 1 | d | ... | d | 0 | 0 | ... | 1 | 0 | ... | 0 |
| 0 | 0 | ... | 0 | 1 | ... | d | 0 | 0 | ... | 0 | 1 | ... | 0 |
| 0 | 0 | ... | 0 | 0 | ... | 1 | 0 | 0 | ... | 0 | 0 | ... | 1 |

(d: don't care)

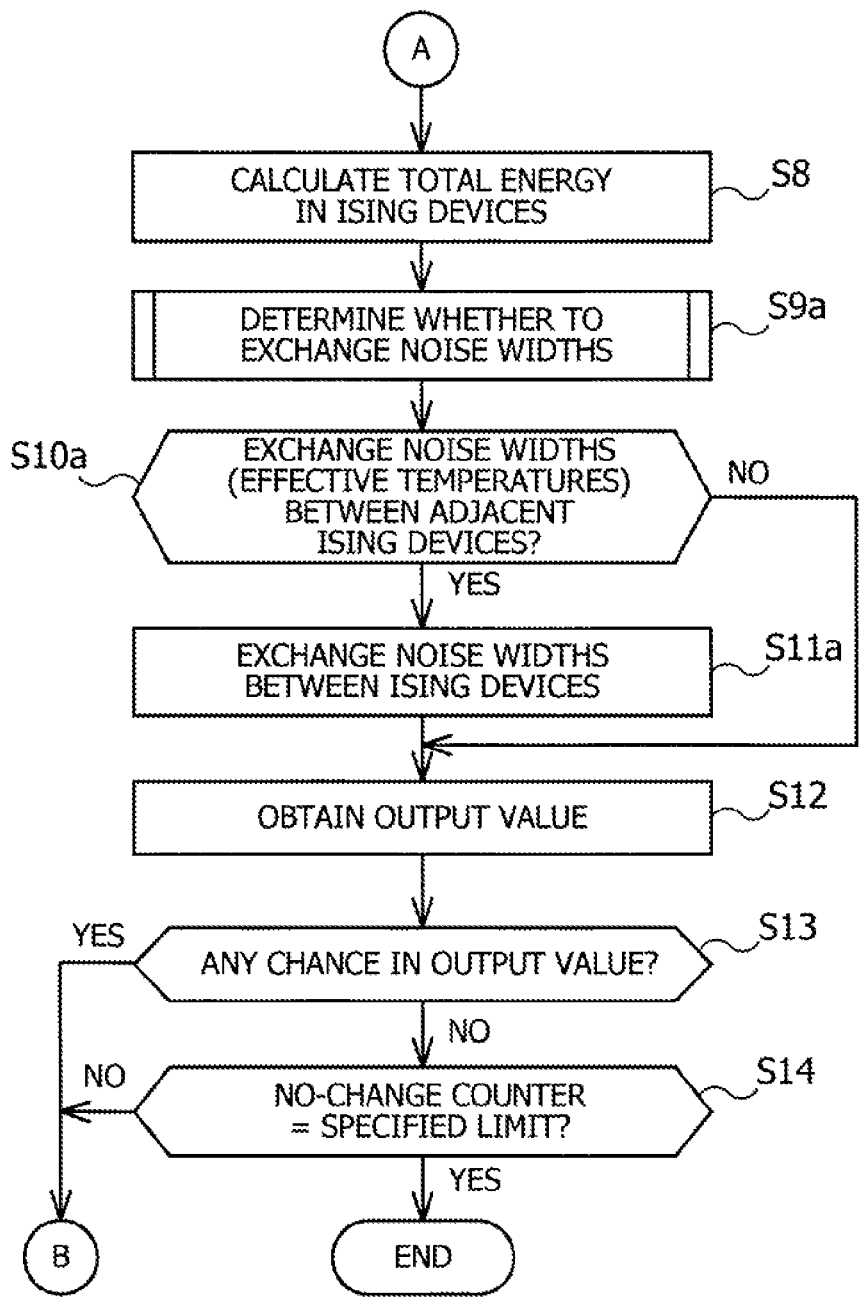

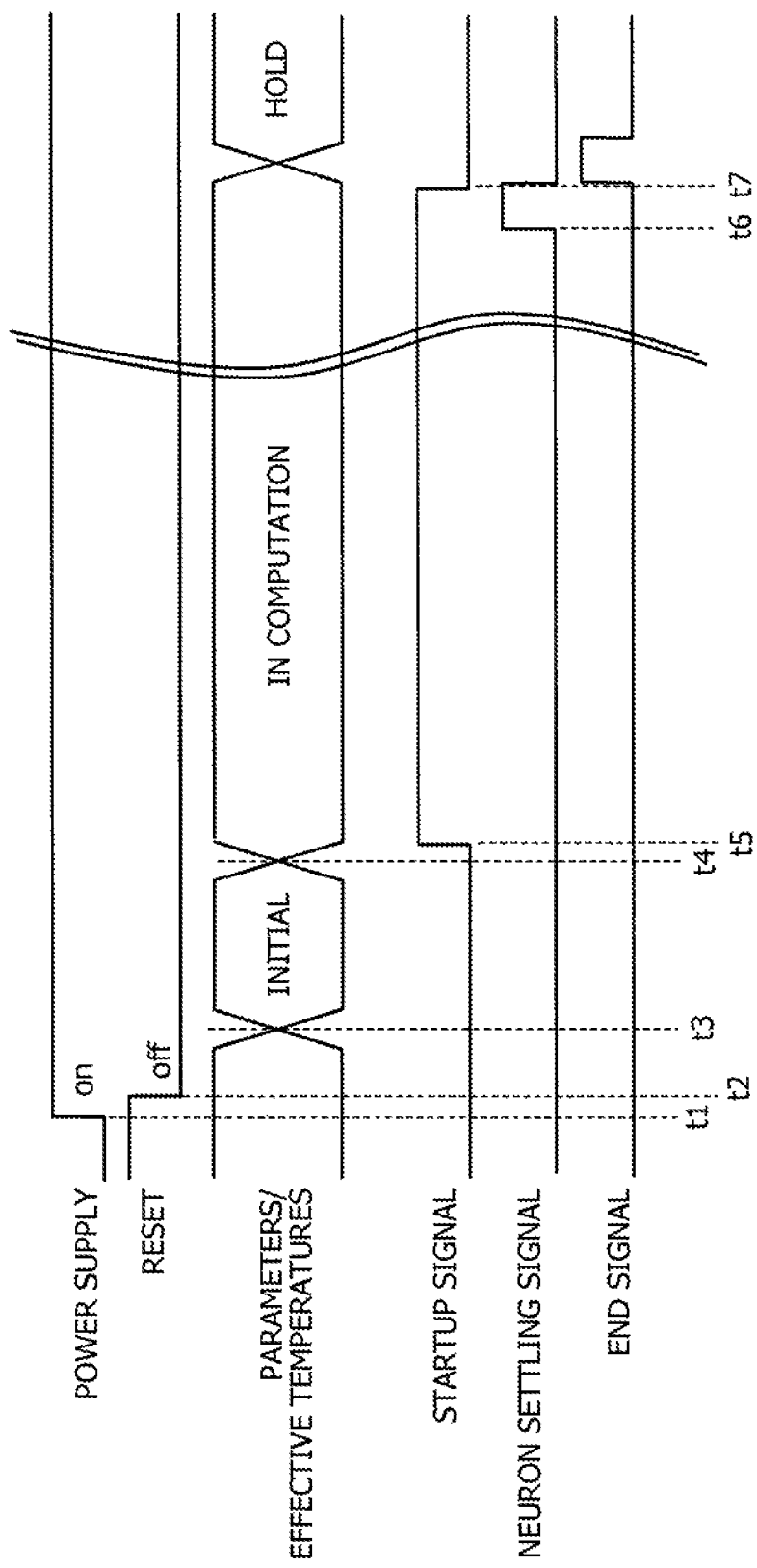

INFORMATION PROCESSING APPARATUS, ISING DEVICE, AND METHOD FOR CONTROLLING INFORMATION PROCESSING APPARATUS

CROSS-REFERENCE TO RELATED APPLICATION

This application is based upon and claims the benefit of priority of the prior Japanese Patent Application No. 2016-131285, filed on Jul. 1, 2016, the entire contents of which are incorporated herein by reference.

FIELD

The embodiments discussed herein relate to an information processing apparatus, an Ising device, and a method for controlling an information processing apparatus.

BACKGROUND

Ising devices, or Boltzmann machines, are known as a technique for solving multivariable optimization problems, for which the von Neumann computer architecture does not always work well. Ising devices execute a process called "simulated annealing" using energy functions of the Ising model that represents behavior of atomic spins in magnetic substances. That is, Ising devices solve a given problem by transforming it to an Ising model problem.

As an example of techniques related to Ising devices, one proposed parallel processing method uses multiple Ising devices implemented in hardware. Another proposed technique is to compare evaluation scores of Ising devices, update inferior evaluation scores, and when identical scores are found, output them as an optimal solution. See, for example, the following documents:
Japanese Laid-open Patent Publication No. 5-250346, Sep. 28, 1993
Japanese Laid-open Patent Publication No. 8-272760, Oct. 18, 1996
C. R. Schneider and H. C. Card, "Analog CMOS Deterministic Boltzmann Circuits", IEEE Journal of Solid-State Circuits, Vol. 28, No. 8, pp. 907-914, August 1993
A. DeGloria et al., "Efficient Implementation of the Boltzmann Machine Algorithm", IEEE Transactions of Neural Networks, Vol. 4, No. 1, pp. 159-163, January 1993
A. DeGloria et al., "Design and Performance Evaluation of a Parallel Architecture for the Boltzmann Machine", EuroMICRO 94: System Architecture and Integration, Proceedings of the 20th EUROMICRO Conference, pp. 629-636, September 1994

As mentioned above, hardware-based implementation of Ising devices is possible. However, even with such Ising devices, the computational process takes a long time to reach an optimal solution because it includes sequential operations that have to be repeated many times.

SUMMARY

In one aspect, there is provided an information processing apparatus including: a plurality of Ising devices each including a neuron circuit block that calculates as many first energy values as a number of neurons, based on weight values representing strengths of neuron-to-neuron connections and output values of the neurons, and determines and outputs new output values, based on comparison results between a threshold and each of the first energy values plus a noise value, the plurality of Ising devices having equal conditions about neuron-to-neuron connections represented by the weight values, the plurality of Ising devices being set up with different noise widths each representing a difference between a lower limit and an upper limit of noise values; a calculation circuit that calculates second energy values respectively representing total energies of the plurality of Ising devices, based on the first energy values and the output values; an exchange control circuit that exchanges output values or noise widths between a first Ising device and a second Ising device among the plurality of Ising devices, with an exchange probability based on a difference in the second energy values between the first Ising device and the second Ising device, the first and second Ising devices respectively having first and second noise widths, the second noise width being adjacent to the first noise width; and a controller device that sets the different noise widths for the plurality of Ising devices.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates a truth table that indicates an exemplary relationship between input signals and output signals of a selection signal generator circuit;
FIG. 12 illustrates a truth table that indicates an exemplary relationship between input signals and output signals of a state selection circuit;
FIG. 18 illustrates a truth table that indicates an exemplary relationship between input signals and output signals of a temperature setting signal generator circuit;
FIG. 19 is a flowchart illustrating exemplary operation of the information processing apparatus according to the third embodiment;
and FIG. 20 is a timing diagram illustrating exemplary operation of the information processing apparatus.

DESCRIPTION OF EMBODIMENTS

Several embodiments will be described in detail below with reference to the accompanying drawings.

(a) First Embodiment

Figure 1:
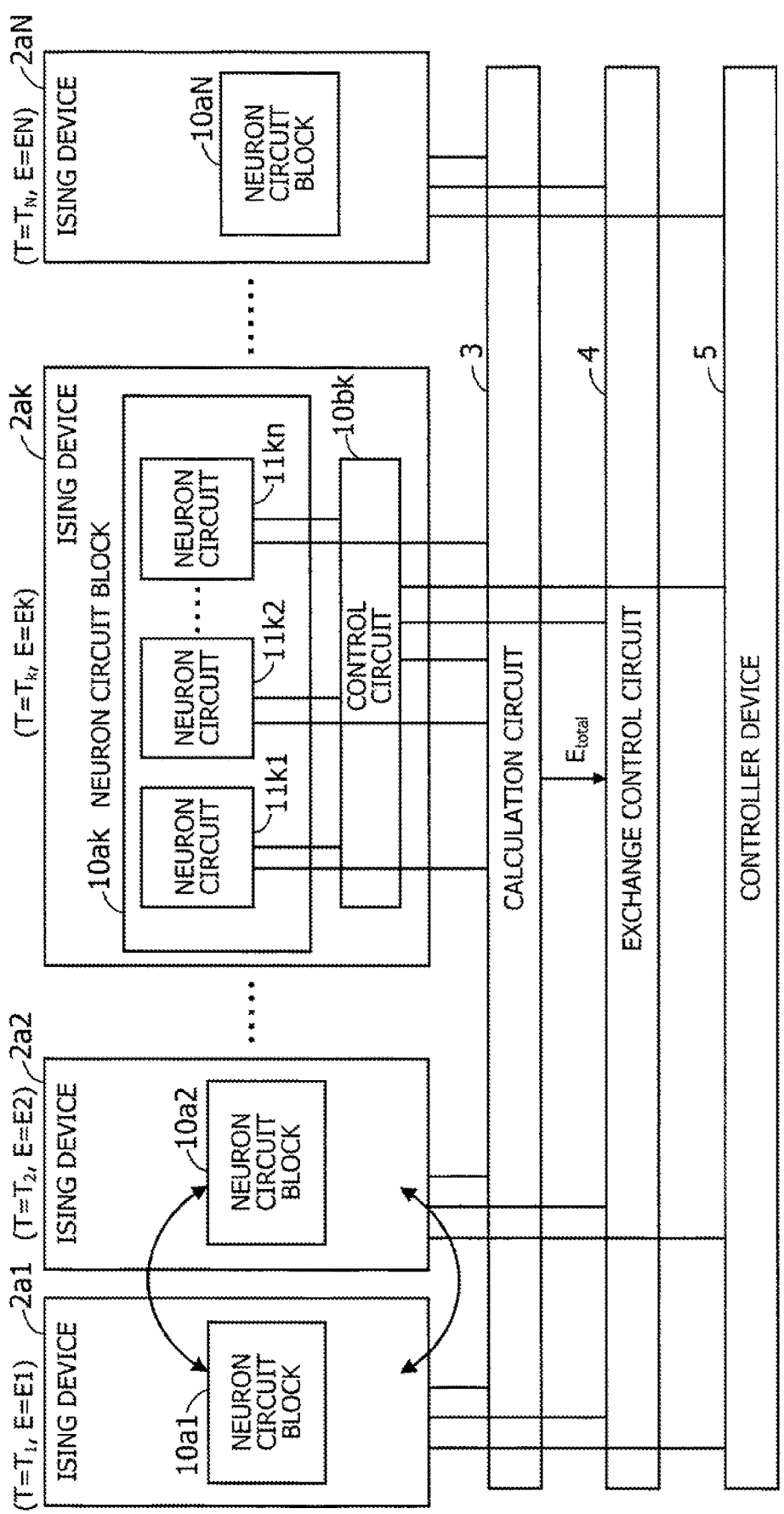
FIG. 1 illustrates an example of an information processing apparatus according to a first embodiment.

FIG. 1 illustrates an example of an information processing apparatus according to a first embodiment. This information processing apparatus 1 includes Ising devices 2a1 to 2aN, a calculation circuit 3, an exchange control circuit 4, and a controller device 5. An optimization problem using energy functions is mapped onto Ising devices 2a1 to 2aN, under the control of a controller device 5. Each Ising device 2a1 to 2aN is implemented in the form of a single semiconductor integrated circuit (chip). These Ising devices 2a1 to 2aN are similar to each other in terms of their components. For example, the illustrated Ising device 2ak has a neuron circuit block 10ak, and a control circuit 10bk.

The neuron circuit block 10ak calculates as many energy values as the number of neurons, based on weight values representing the strengths of neuron-to-neuron connections, as well as on output values of the neurons. The energy values are referred to as "local field values" in the following description.

The weight values are specified by, for example, the controller device 5, depending on what optimization problem is being handled. That is, the controller device 5 writes specific weight values into Ising devices 2a1 to 2aN, thereby mapping an optimization problem onto the Ising devices 2a1 to 2aN.

The neuron circuit block 10ak adds some noise values to local field values and compares the respective sums with a threshold. Based on the result of this comparison, the neuron circuit block 10ak determines and outputs the output values mentioned above. The following description uses an integer n to indicate the number of neurons.

Referring to the example of FIG. 1, the neuron circuit block 10ak includes n neuron circuits 11k1, 11k2, ..., and 11kn to implement the functions of n neurons. Each neuron circuit 11k1 to 11kn executes the above-noted process of calculating a local field value and determining and outputting a one-bit output value of the corresponding neuron. When there is a change in one of the n output values (or n-bit output value) from the neurons, an update signal is generated. Each neuron circuit 11k1 to 11kn has a function of updating its own local field value upon receipt of such an update signal.

The control circuit 10bk supplies the neuron circuits 11k1 to 11kn with the update signals noted above. For example, one update signal includes a changed output value and a selection signal for weight values. This selection signal specifies which weight to choose, depending on the identifier of the neuron circuit that has changed its output value.

For example, the above-described control circuit 10bk may be implemented as a collection of comparator circuits, selector circuits, and other circuits. The control circuit 10bk may be implemented by using one or more processors. For example, the processors include a central processing unit (CPU), micro processing unit (MPU), digital signal processor (DSP), application-specific integrated circuit (ASIC), programmable logic device (PLD), or any combination of these devices.

The Ising devices 2a1 to 2aN are configured with the above-described elements, and their respective sets of neurons are connected in the same way (i.e., they have the same set of weight values). In other words, the neuron circuit blocks 10a1, 10a2, ..., 10ak, ..., and 10aN included in the Ising devices 2a1 to 2aN have a plurality of neuron circuits with the same weighted connections. Because of these same weighted neural connections, the Ising devices 2a1 to 2aN respectively calculate identical optimization problems in an independent manner. These Ising devices 2a1 to 2aN are, however, set up with different noise widths. The term "noise width" refers to the extent (distance) between upper and lower limits of noise values used in the Ising devices 2a1 to 2aN. In other words, the noise values used in each Ising device may vary within a different range.

Based on the local field values and n-bit output values of energy of the individual Ising devices 2a1 to 2aN, the calculation circuit 3 calculates energy values (E1, E2, ..., Ek, ..., EN) each representing the total amount of energy in the individual Ising devices 2a1 to 2aN. For example, the calculation circuit 3 multiplies the local field value of the first neuron circuit 11k1 by the output value of the same. The calculation circuit 3 also performs a similar multiplication for each of the other neuron circuits 11k2 to 11kn. The calculation circuit 3 then adds up the resulting products to yield an energy value Ek of the k-th Ising device 2ak. In other words, the calculation circuit 3 obtains an energy value Ek by performing multiply-accumulate (MAC) operations on the local field values and output values that the neuron circuits 11k1 to 11kn provide.

The exchange control circuit 4 controls exchange of n-bit output values or noise widths between two of the Ising devices 2a1 to 2aN, where the two Ising devices are set up with noise widths that are adjacent to each other. The exchange takes place with a probability based on a difference in the above-described energy values between the two Ising devices. Such exchanges are part of an extended ensemble method (described later), and the probability of their occurrence is called "exchange probability."

Noise width is equivalent to effective temperature T in equation (5) described later. Expanding a noise width means raising effective temperature T. The Ising devices 2a1 to 2aN in FIG. 1 are respectively given different effective temperatures $T_1, T_2, \ldots, T_k, \ldots$, and $T_N$. The first Ising device 2a1 has a first noise width corresponding to effective temperature $T_1$, and the second Ising device 2a2 has a second noise width corresponding to effective temperature $T_2$. In the case of $T_1 > T_2 > \ldots > T_k > \ldots > T_N$, the first and second Ising devices 2a1 and 2a2 are "adjacent" in terms of their noise widths. The exchange control circuit 4 thus exchanges their n-bit output values (or their noise widths) with each other, with an exchange probability based on the difference between energy values E1 and E2 of the two Ising devices 2a1 and 2a2.

The calculation circuit 3 and exchange control circuit 4 may be provided outside the Ising devices 2a1 to 2aN as in the example of FIG. 1. Alternatively, either or both of the calculation circuit 3 and exchange control circuit 4 may be incorporated into the Ising devices 2a1 to 2aN.

The controller device 5 configures each Ising device 2a1 to 2aN with a uniquely different noise width. For example, the controller device 5 gives different noise widths to the Ising devices 2a1 to 2aN upon receipt of a startup signal from an external source, such that their effective temperatures T will be $T_1 > T_2 > \ldots > T_k > \ldots > T_N$.

The controller device 5 outputs an end signal to indicate completion of the current computation when a neuron settlement signal arrives from one of the Ising devices 2a1 to 2aN. This neuron settlement signal indicates that the n-bit output value has converged (i.e., stopped changing) in the sending Ising device.

Figure 2:
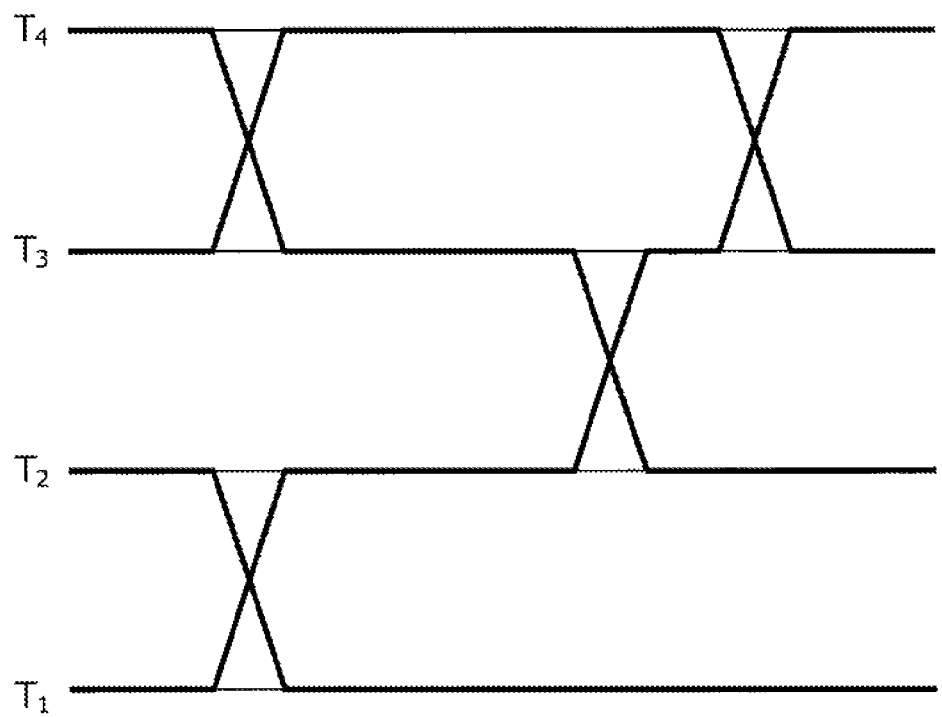
FIG. 2 illustrates how a plurality of ensembles with different temperatures exchange their node states.
Figure 3:
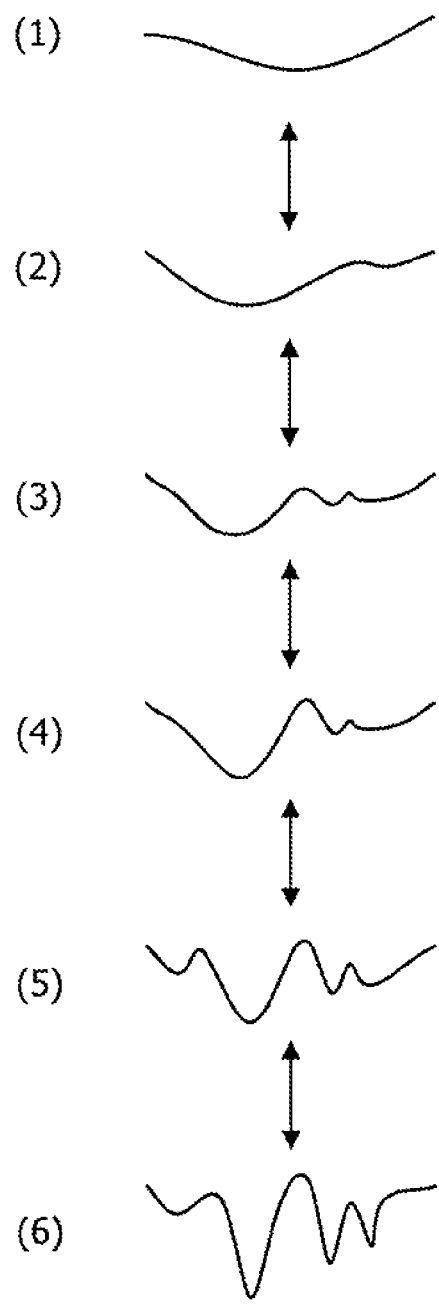
FIG. 3 illustrates energy functions of ensembles with different temperatures.

Now, with reference to FIGS. 2 and 3, the description turns to an extended ensemble method that the information processing apparatus 1 performs. This method may also be called an "exchange Monte Carlo method" or "ensemble exchange method."

Here the term "ensemble" refers to a neural network with a particular temperature. The extended ensemble method exchanges states of nodes between different ensembles (i.e., different neural networks having different temperatures) during the course of a parallel probabilistic search performed in those ensembles. More specifically, exchanging of node states takes place between two ensembles having adjacent temperatures, depending on their energy difference. This method prevents the search from falling into a local optimal solution and thus makes it possible to reach the optimal value in a shorter time.

FIG. 2 illustrates how a plurality of ensembles with different temperatures exchange their node states. It is assumed in this example of FIG. 2 that four ensembles have been prepared and set up with successively increasing temperatures $T_1$, $T_2$, $T_3$, and $T_4$ (i.e., $T_1<T_2<T_3<T_4$). According to the extended ensemble method, two ensembles having adjacent temperatures exchange their node states with a certain exchange probability. Here the exchange probability may be expressed as min(1, R), where R is given by the following equation (1).

$$R=\exp\{(1/T_q-1/T_{q+1})(E_{total}(X_q)-E_{total}(X_{q+1}))\} \quad (1)$$

The symbols $T_q$ and $T_{q+1}$ in this equation (1) represent the temperatures of the q-th and (q+1)th ensembles. That is, temperatures $T_q$ and $T_{q+1}$ are adjacent to each other. $E_{total}(X_q)$ and $E_{total}(X_{q+1})$ denote the total energies of the noted ensembles. $X_q$ includes all the node states of the q-th ensemble, as does $X_{q+1}$ for the (q+1)th ensemble.

As can be seen from equation (1), R exceeds one when $T_q<T_{q+1}$ and $E_{total}(X_q)>E_{total}(X_{q+1})$. This means that the exchange probability reaches one, thus causing an exchange of node states to happen. For example, an ensemble having a temperature of $T_1$ would exchange node states with an ensemble having a temperature of $T_2$ when the energy of the latter ensemble is smaller than the energy of the former ensemble.

In contrast, when $T_q<T_{q+1}$ and $E_{total}(X_q)<E_{total}(X_{q+1})$ an exchange of node states takes place with a probability of R. For example, an ensemble having a temperature of $T_1$ would exchange node states with an ensemble having a temperature of $T_2$ with a probability of R when the energy of the latter ensemble is larger than the energy of the former ensemble.

FIG. 3 illustrates energy functions of ensembles with different temperatures. Six curves (1) to (6) are seen in FIG. 3, representing energy functions of ensembles having successively decreasing temperatures. The topmost curve (1) is of the highest-temperature ensemble, and the bottommost curve (6) is of the lowest-temperature ensemble. As the temperature rises, the curve becomes gentler (i.e., has fewer peaks and bottoms, and the slopes are more gradual). For example, the topmost curve (1) is less likely to fall into a local optimal solution because it is gentler than the bottom most curve (6).

As described above, the extended ensemble method exchanges node states between two ensembles having adjacent temperatures. Suppose, for example, one ensemble has an energy function of curve (6). This ensemble may be trapped into a local optimal solution, but the noted exchanging of node states permits the ensemble to move to different node states that were previously of a higher-temperature ensemble. That is, the former ensemble may move to a different energy function of curve (5) with a certain exchange probability, thus exiting from the local optimal solution. This mechanism of the extended ensemble method permits faster convergence of solutions to an optimal point than the conventional simulated annealing methods. It is noted that the above-described extended ensemble method may be modified to exchange temperatures, instead of node states. The same advantages will be achieved also in this modified version.

In the proposed information processing apparatus of the first embodiment, the above-described extended ensemble method is implemented in the hardware circuitry. Specifically, the ensembles discussed above correspond to Ising devices 2a1 to 2aN, and the node states correspond to the n-bit output value of each neuron circuit block 10a1 to 10aN. The temperatures discussed above correspond to effective temperatures $T_1$ to $T_N$ (or noise widths) given to the Ising devices 2a1 to 2aN.

The calculation circuit 3 is configured to calculate energy values on the basis of local field values and n-bit output values. These energy values represent total energies of individual Ising devices 2a1 to 2aN and are used as $E_{total}(X_q)$ and $E_{total}(X_{q+1})$ in equation (6). Further, the exchange control circuit 4 is configured to exchange n-bit output values or noise widths between two of the Ising devices 2a1 to 2aN that have adjacent noise widths, with an exchange probability min(1, R) based on the difference in energy values between the two Ising devices.

As can be seen from the above description, the proposed information processing apparatus 1 uses a hardware-based implementation of an extended ensemble method to obtain optimal solutions in a short time. The present embodiment thus reduces the time for solving optimization problems.

The calculation of exchange probabilities uses energy values. These energy values are obtained by performing MAC operations between local field values and output values at each neuron. The proposed calculation circuit 3 calculates energy values with a simple circuit structure for MAC operations.

(b) Second Embodiment

Figure 4:
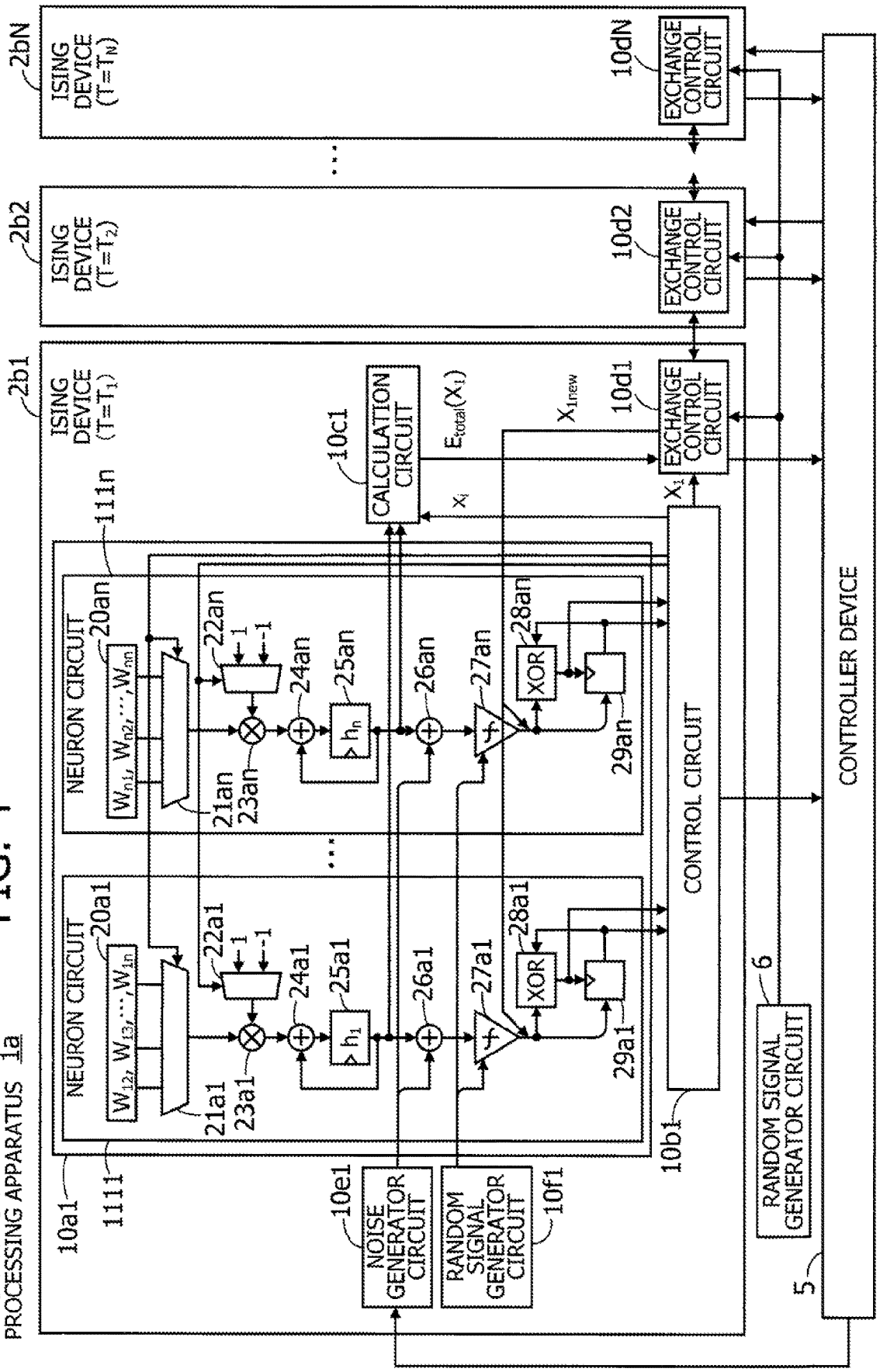
FIG. 4 illustrates an example of an information processing apparatus according to a second embodiment.

FIG. 4 illustrates an example of an information processing apparatus according to a second embodiment. Several elements in this information processing apparatus of FIG. 4 have the same reference numerals as their counterparts in FIG. 1.

The illustrated information processing apparatus 1a includes Ising devices 2b1 to 2bN, a controller device 5, and a random signal generator circuit 6. The Ising devices 2b1 to 2bN in FIG. 4 are respectively set up with different effective temperatures T of $T_1, T_2, \ldots$, and $T_N$. Specifically, the Ising devices 2b1 to 2bN in FIG. 4 are assumed to have successively smaller temperatures as in $T_1>T_2> \ldots >T_N$. As the Ising devices 2b1 to 2bN have the same internal structure, the following description focuses on one Ising device 2b1 as a representative example.

The Ising device 2b1 includes a neuron circuit block 10a1, a control circuit 10b1, a calculation circuit 10c1, and an exchange control circuit 10d1. The Ising device 2b1 also includes a noise generator circuit 10e1 and a random signal generator circuit 10f1, which are omitted in FIG. 1. The calculation circuit 10c1 and exchange control circuit 10d1 provide the same functions as the calculation circuit 3 and exchange control circuit 4 in the foregoing first embodiment.

The neuron circuit block 10a1 includes n neuron circuits 1111 to 111n. In the example of FIG. 4, the neuron circuits 1111 to 111n are designed to execute processing based on what is called DeGloria algorithm.

(b1) Exemplary Neuron Circuit

FIG. 4 provides the details of two neuron circuits 1111 and 111n, while omitting others because of their similarity to the neuron circuits 1111 and 111n.

The first neuron circuit 1111 includes a register 20a1, selector circuits 21a1 and 22a1, a multiplier circuit 23a1, an adder circuit 24a1, another register 25a1, another adder circuit 26a1, a comparator circuit 27a1, an exclusive OR (XOR) gate 28a1, and yet another register 29a1. Similarly, the n-th neuron circuit 111n includes a register 20an, selector circuits 21an and 22an, a multiplier circuit 23an, an adder circuit 24an, another register 25an, another adder circuit 26an, a comparator circuit 27an, an XOR gate 28an, and yet another register 29an.

The register 20a1 in the first neuron circuit 1111 stores therein n weight values $W_{12}, W_{13}, \ldots,$ and $W_{1n}$. The register 20an in the n-th neuron circuit 111n stores therein n weight values $W_{n1}, W_{n2}, \ldots,$ and $W_{nn}$. These weight values are specified by the controller device 5, depending on the problem to be solved, and entered to the registers 20a1 to 20an. As an alternative, weight values may be stored in a random access memory (RAM) or other memory devices.

The selector circuit 21a1 in the first neuron circuit 1111 selects one of the weight values $W_{12}$ to $W_{1n}$ stored in the register 20a1, based on a selection code signal from control circuit 10b1. Similarly, the selector circuit 21an in the n-th neuron circuit 111n selects one of the weight values $W_{n1}$ to $W_{nn}$ stored in the register 20an, based on the same selection code signal. For example, when the first neuron circuit 1111 changes its output value, the selector circuit 21an in the n-th neuron circuit 111n selects a weight value $W_{n1}$ according to a selection code signal.

When a neuron circuit changes its output value, the control circuit 10b1 outputs zero or one representing the changed output value. The selector circuits 22a1 to 22an select either one (1) or minus one (−1) according to that output value supplied from the control circuit 10b1. When the output value is zero, the selector circuit 22a1 to 22an selects one. When the output value is one, the selector circuit 22a1 to 22an selects minus one. The reason for this operation will be described later.

The multiplier circuit 23a1 in the first neuron circuit 1111 calculates the product of outputs from the two selector circuits 21a1 and 22a1 described above. Similarly, the multiplier circuit 23an in the n-th neuron circuit 111n calculates the product of outputs from the two selector circuits 21an and 22an.

The adder circuit 24a1 in the first neuron circuit 1111 adds the output value of the multiplier circuit 23a1 to what the register 25a1 currently stores. Similarly, the adder circuit 24an in the n-th neuron circuit 111n adds the output value of the multiplier circuit 23an to what the register 25an currently stores.

The register 25a1 in the first neuron circuit 1111 takes in the output value of the adder circuit 24a1 in synchronization with a clock signal (not illustrated in FIG. 4). Similarly, the register 25an in the n-th neuron circuit 111n takes in the output value of the adder circuit 24an in synchronization with a clock signal (not illustrated in FIG. 4). For example, the registers 25a1 to 25an may be flip-flops. The registers 25a1 to 25an are initialized with what will be described later as bias values.

The symbols $h_1$ and $h_n$ seen inside the boxes representing registers 25a1 and 25an in FIG. 4 are local field values. That is, the aforementioned local field values are stored in the registers 25a1 to 25an.

The adder circuit 26a1 in the first neuron circuit 1111 adds a noise value to the output value of the register 25a1. The noise value is provided from the noise generator circuit 10e1. Similarly, the adder circuit 26an in the n-th neuron circuit 111n adds a noise value to the output value of the register 25an. Some examples of noise values will be described later.

The noise generator circuit 10e1 outputs noise values under the control of the controller device 5. For example, the noise generator circuit 10e1 includes an amplifier circuit, and the controller device 5 varies the gain of this amplifier circuit so as to control the noise width corresponding to a given effective temperature.

The comparator circuit 27a1 in the first neuron circuit 1111 outputs a value of one if the output of the adder circuit 26a1 is greater than a threshold, and otherwise a value of zero. Similarly, the comparator circuit 27an in the n-th neuron circuit 111n outputs a value of one if the output of the adder circuit 26an is greater than a threshold, and otherwise a value of zero.

Each comparator circuit 27a1 to 27an has an enable input. These enable inputs of the comparator circuits 27a1 to 27an are controlled individually, such that only one of the neuron circuits 1111 to 111n in the Ising device 2b1 is allowed to change its output value at a time. More specifically, random values are generated by a random signal generator circuit 10f1 to enable a single randomly-selected comparator circuit while disabling the others. For example, the random signal generator circuit 10f1 may be implemented with a linear feedback shift register (LFSR). LFSR may also be used to implement the foregoing noise generator circuit 10e1.

The XOR gate 28a1 in the first neuron circuit 1111 outputs a value of zero when either the output of the comparator circuit 27a1 or a value supplied from the exchange control circuit 10d1 matches with the output of the register 29a1. Otherwise, the XOR gate 28a1 outputs a value of one. Similarly, the XOR gate 28an in the n-th neuron circuit 111n outputs a value of zero when either the output of the comparator circuit 27an or a value supplied from the exchange control circuit 10d1 matches with the output of the register 29an. Otherwise, the XOR gate 28an outputs a value of one.

Although not explicitly illustrated in FIG. 4, each individual comparator circuit 27a1 to 27an has its own selector circuit at its output end. This non-illustrated selector circuit is used to select one bit out of an n-bit output value $X_{1new}$ supplied from the exchange control circuit 10d1 or the output value of its local comparator circuit 27a1 to 27an. These n selector circuits as a whole select an n-bit output value $X_{1new}$ when the exchange control circuit 10d1 outputs it. Instead of outputs of the comparator circuits 27a1 to 27an, the individual bits of the selected n-bit output value $X_{1new}$ are then supplied to the XOR gates 28a1 to 28an and registers 29a1 to 29an.

As noted above, the exchange control circuit 10d1 in the Ising device 2b1 supplies an n-bit output value $X_{1new}$. This value is actually originated from the neuron circuit block 10a1 in the Ising device 2b1 itself or its counterpart (not illustrated in FIG. 4) in the next Ising device 2b2. For example, the first bit value of $X_{1new}$ is supplied to the XOR gate 28a1 in the first neuron circuit 1111, and the n-th bit value of the same is supplied to the XOR gate 28an in the n-th neuron circuit 111n.

The register 29a1 in the first neuron circuit 1111 takes in a value from the comparator circuit 27a1 or from the exchange control circuit 10d1, when the XOR gate 28a1 outputs a value of one. This act means that the first neuron circuit 1111 changes (updates) its output value $x_1$. Similarly, the register 29an in the n-th neuron circuit 111n takes in a value from the comparator circuit 27an or from the exchange control circuit 10d1, when the XOR gate 28an outputs a value of one, thus changing the output value $x_n$ of the n-th neuron circuit 111n.

The above-described neuron circuits 1111 to 111n implement an energy function E(x) in the Ising model with a relatively small hardware size. For example, the energy function E(x) is defined by the following equation (2).

$$E(x) = -\sum_{\langle i,j \rangle} W_{ij} x_i x_j - \sum_i b_i x_i \qquad (2)$$

The first term in the right-hand side is a sum of weighted products of two neuron circuit outputs $x_i$ and $x_j$, where weight values $W_{ij}=W_{ji}$ and $W_{ii}=0$. The accumulation of products is performed with respect to every possible combination of two neuron circuits, with no missing or duplicated combinations.

The second term in the right-hand side is a sum of products between bias values and output values with respect to all the neuron circuits. The symbol $b_i$ represents the bias value of the i-th neuron circuit.

For hardware-based implementation of the above energy function E(x), the neuron circuits 1111 to 111n in FIG. 4 calculate their respective local field values $h_1$ to $h_n$. For example, the following equation (3) gives a local field value $h_i$ of the i-th neuron circuit 111i, where 1≤i≤n.

$$h_i = \sum_j W_{ij} x_j + b_i \qquad (3)$$

The first term in the right-hand side of equation (3) is a sum of products that represent weighted output values of the neuron circuits 1111 to 111n. Here, each weight value $W_{ij}$ denotes the strength of a connection between the i-th neuron circuit and another neuron circuit in the Ising device 2b1.

As mentioned above, the Ising device 2b1 is allowed to change only one output value at a time although it has many neuron circuits 1111 to 111n. When such a change is made at a certain neuron circuit, other neuron circuits connected to that changing neuron circuit add the change to or subtract the change from their respective current local field values. Suppose, for example, that the j-th neuron circuit is coupled to input of the i-th neuron circuit, where 1≤j≤n. When the j-th neuron circuit changes its output value from $x_j$ (0 or 1) to $1-x_j$, the local field value of the i-th neuron circuit makes a change $\Delta h_i$ given by the following equation (4).

$$\Delta h_i = h_i|_{x_j \to 1-x_j} - h_i = W_{ij}(1-2x_j) \qquad (4)$$

The difference $(1-2x_j)$ seen in this equation (4) takes a value of $-1$ when the output value $x_1$ changes from 0 to 1, and a value of $+1$ when it changes from 1 to 0. This processing of $(1-2x_j)$ is implemented in the selector circuits 22a1 to 22an in FIG. 4.

As described previously, the neuron circuits 1111 to 111n seen in FIG. 4 include comparator circuits 27a1 to 27an to compare their respective local field values $h_1$ to $h_n$ plus some noise value with a threshold. For example, noise values are determined such that the probability that the comparator circuits 27a1 to 27an output a value of one (in other words, the output value $x_1$ to $x_n$ of each neuron circuit 1111 to 111n becomes one) will follow a sigmoid function. More specifically, a noise value is added to the local field value $h_i$ so that the i-th neuron circuit will yield an output value $x_i=1$ with a probability $P_i(h_i)$ seen below.

$$P_i(h_i) = 1/[1+\exp(-h_i/T)] \qquad (5)$$

The symbol T in equation (5) represents effective temperature. To achieve the above probability $P_i(h_i)$ in equation (5), the noise values ns have to follow the probability density function of equation (6) below.

$$p(ns) = \exp(-h_i/T)/[1+\exp(-h_i/T)]^2 \qquad (6)$$

Figure 5:
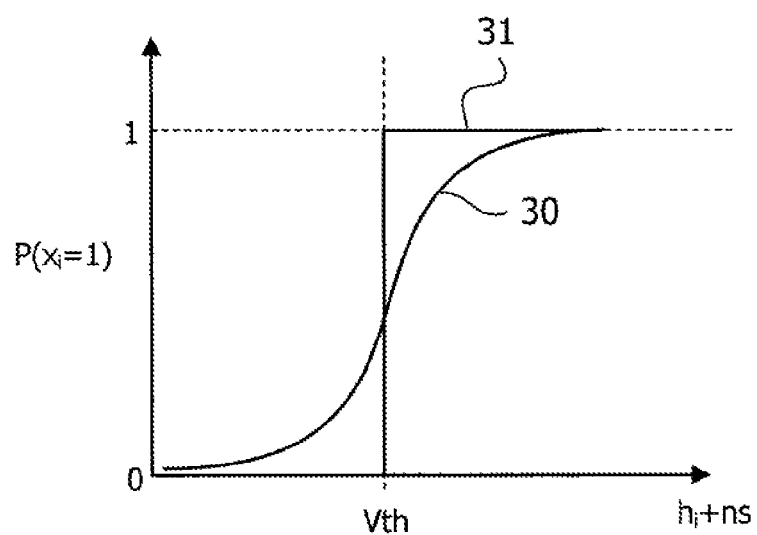
FIG. 5 illustrates an exemplary distribution of probability $P_i(h_i)$ of output value $x_i=1$.

FIG. 5 illustrates an exemplary distribution of probability $P_i(h_i)$ that output value $x_i$ takes a value of one. The horizontal axis represents the sum of local field value $h_i$ and noise value ns, while the vertical axis represents the probability of $x_i=1$. FIG. 5 actually plots two graphs 30 and 31. The first graph 30 indicates the probability $P_i(h_i)$ that the i-th neuron circuit yields an output value $x_i$ of one when its comparator circuit receives a sum of local field value $h_i$ and noise value ns, assuming that the noise value ns varies according to the foregoing probability density function p(ns) of equation (6). The second graph 31 indicates the probability $P_i(h_i)$ that the i-th neuron circuit yields an output value $x_i$ of one when its comparator circuit receives a local field value $h_i$ alone.

Without noise values, the probability $P_i(h_i)$ makes a stepwise change from zero to one, as seen in the second graph 31, at the point where the local field value $h_i$ exceeds a threshold Vth. In contrast, with noise values ns added to the local field value $h_i$, the probability $P_i(h_i)$ moderately varies according to a sigmoid function as seen in the first graph 30.

This concludes the explanation of neuron circuits 1111 to 111n.

(b2) Calculation Circuit

Figure 6:
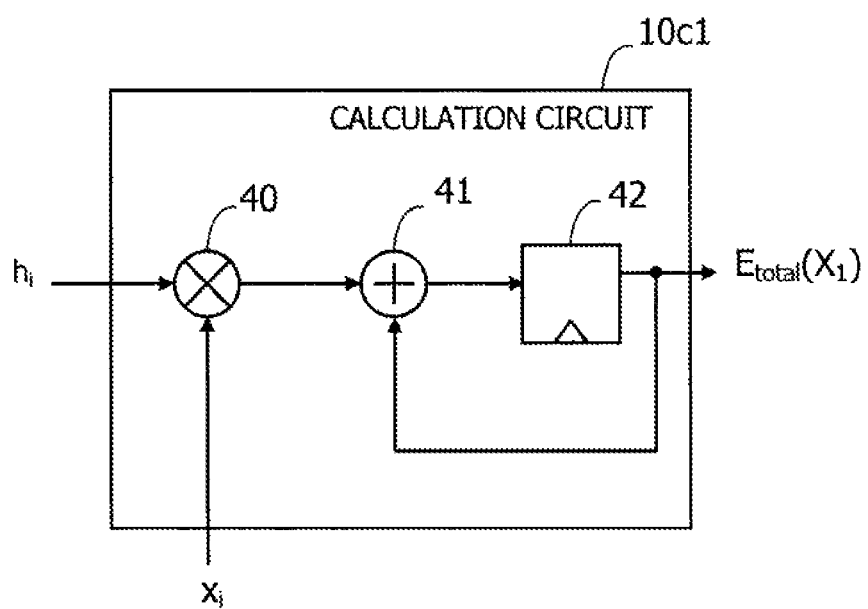
FIG. 6 illustrates an example of a calculation circuit.

FIG. 6 illustrates an example of a calculation circuit. This calculation circuit 10c1 includes a multiplier circuit 40, an adder circuit 41, and a register 42. These components work as follows.

The multiplier circuit 40 calculates a product of an output value $x_i$ and a local field value $h_i$. The output value $x_i$ refers to the i-th bit of an n-bit output value $X_1$ from the neuron circuit block 10a1. The local field value $h_i$ is a value stored in a register in the i-th neuron circuit 111i, where 1≤i≤n. The adder circuit 41 calculates a sum of the current value in the register 42 and the above product calculated by the multiplier circuit 40. The register 42 takes in this sum from the adder circuit 41 in synchronization with a clock signal (not illustrated in FIG. 6).

The calculation circuit 10c1 receives each output value $x_i$ and each local field value $h_i$, where i is an integer number that varies in the range of one to n. With the circuit structure of FIG. 6, the calculation circuit 10c1 performs MAC operations between output values $x_1$ to $x_n$ and local field values $h_1$ to $h_n$. The result of the MAC operations is referred to as an energy value $E_{total}(X_1)$. This energy value $E_{total}(X_1)$ represents the total amount of energy in the Ising device 2a1.

(b3) Exchange Control Circuit

As part of the circuits designed for the foregoing extended ensemble method, the exchange control circuit 10d1 in FIG. 4 exchanges n-bit output values between two Ising devices 2a1 and 2a2 with an exchange probability based on a difference between the two Ising devices in terms of the energy values discussed above.

Figure 7:
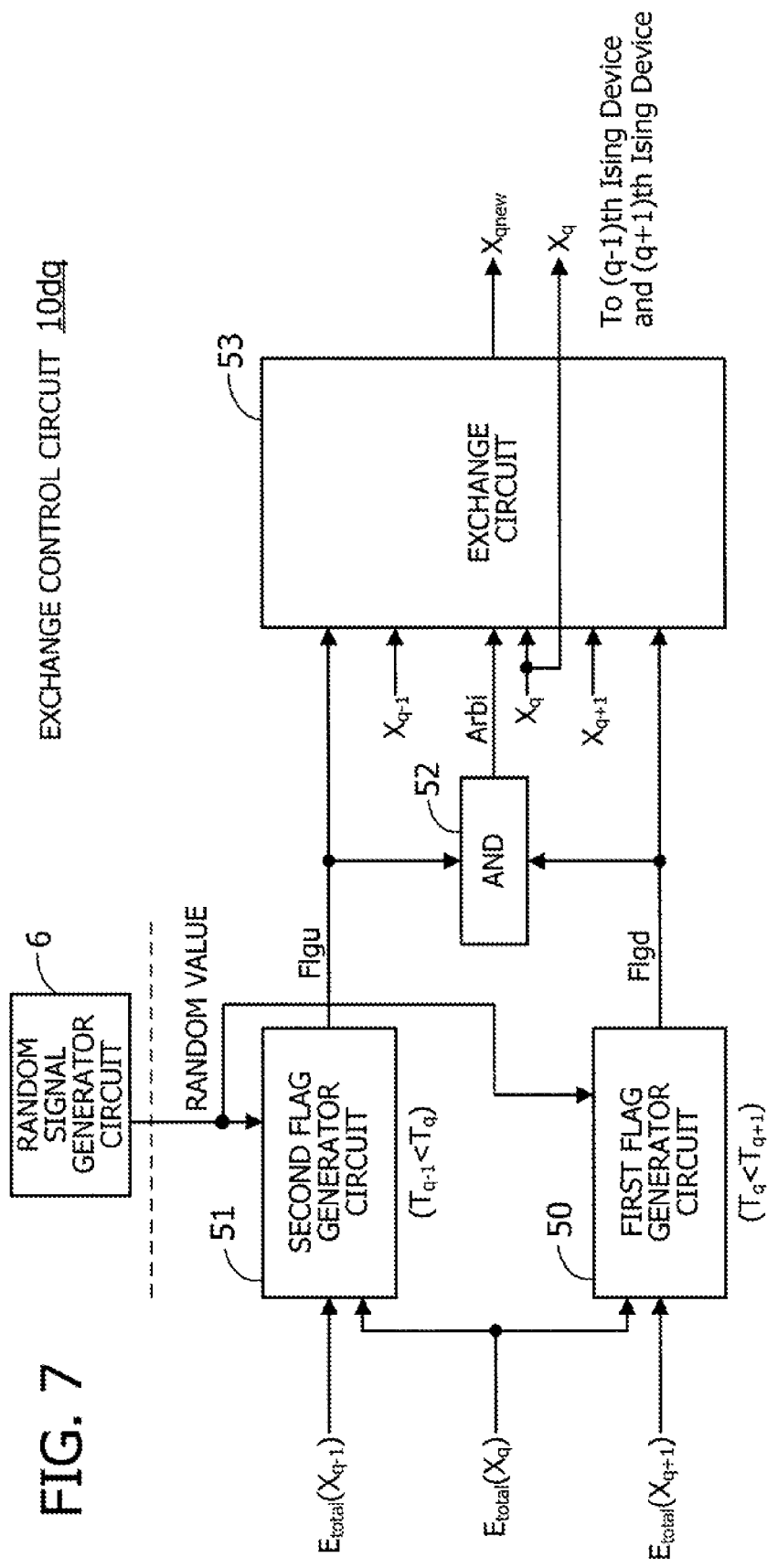
FIG. 7 illustrates an example of an exchange control circuit.

FIG. 7 illustrates an example of an exchange control circuit. This exchange control circuit 10dq of FIG. 7 represents N exchange control circuits 10d1 to 10dN in the Ising devices 2b1 to 2bN. Specifically, the exchange control circuit 10dq is the one in the q-th Ising device 2bq, where 1≤q≤N. The exchange control circuit 10dq is formed from first and second flag generator circuits 50 and 51, an AND gate 52, and an exchange circuit 53.

The first flag generator circuit 50 receives an energy value $E_{total}(X_q)$ representing the total amount of energy in the q-th Ising device itself. The first flag generator circuit 50 also receives an energy value $E_{total}(X_{q+1})$ representing the total amount of energy in the (q+1)th Ising device. The (q+1)th Ising device has an effective temperature $T_{q+1}$ higher than the q-th Ising device's $T_q$. The first flag generator circuit 50 further receives a random value from the random signal generator circuit 6. Based on the received two energy values $E_{total}(X_q)$ and $E_{total}(X_{q+1})$ and random value, the first flag generator circuit 50 generates and outputs a flag signal Flgd. This flag signal Flgd indicates whether to cause the neuron circuits in the q-th and (q+1)th Ising devices to exchange their n-bit output values $X_q$ and $X_{q+1}$. When flag signal Flgd is asserted to one, it means that output values $X_q$ and $X_{q+1}$ are to be exchanged with each other. When flag signal Flgd stays zero, it means that no exchange is to be made between two output values $X_q$ and $X_{q+1}$.

The second flag generator circuit 51 receives an energy value $E_{total}(X_q)$ representing the total amount of energy in the q-th Ising device. The second flag generator circuit 51 also receives an energy value $E_{total}(X_{q-1})$ representing the total amount of energy in the (q-1)th Ising device. The (q-1)th Ising device has an effective temperature $T_{q-1}$ lower than the q-th Ising device's $T_q$. The second flag generator circuit 51 further receives a random value from the random signal generator circuit 6. Based on the received two energy values $E_{total}(X_q)$ and $E_{total}(X_{q-1})$ and random value, the second flag generator circuit 51 generates and outputs a flag signal Flgu. This flag signal Flgu indicates whether to cause the neuron circuits in the q-th and (q-1)th Ising devices to exchange their n-bit output values $X_q$ and $X_{q-1}$. When flag signal Flgu is asserted to one, it means that output values $X_q$ and $X_{q-1}$ are to be exchanged with each other. When flag signal Flgu stays zero, it means that no exchange is to be made between output values $X_q$ and $X_{q-1}$.

Figure 8:
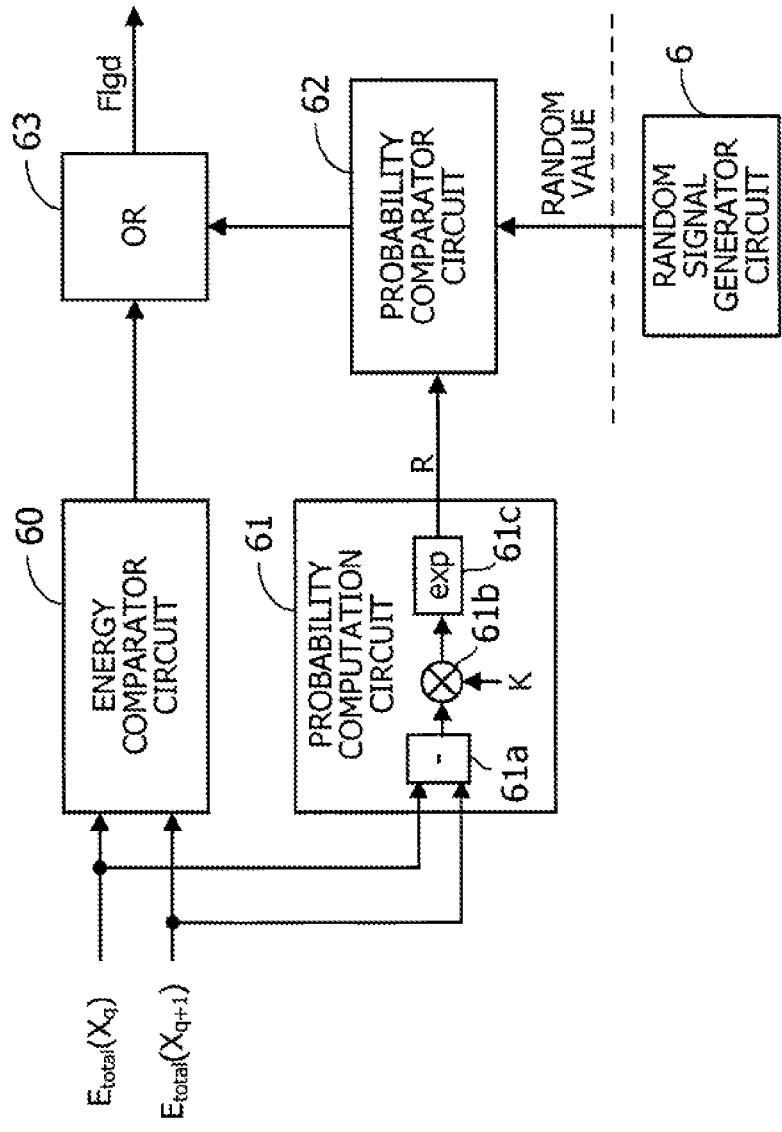
FIG. 8 illustrates an example of a flag generator circuit.

FIG. 8 illustrates an example of a flag generator circuit. More particularly, FIG. 8 illustrates an example of the first flag generator circuit 50. The first flag generator circuit 50 may be designed to operate on the basis of what is called the Metropolis-Hastings algorithm. The illustrated first flag generator circuit 50 is formed from an energy comparator circuit 60, a probability computation circuit 61, a probability comparator circuit 62, and an OR gate 63.

The energy comparator circuit 60 compares energy values $E_{total}(X_q)$ and $E_{total}(X_{q+1})$. When $E_{total}(X_q)$ is greater than $E_{total}(X_{q+1})$, the energy comparator circuit 60 outputs a value of one. When $E_{total}(X_q)$ is smaller than $E_{total}(X_{q+1})$, the energy comparator circuit 60 outputs a value of zero.

The probability computation circuit 61 calculates a probability R according to equation (1). Specifically, the probability computation circuit 61 is formed from a subtracter circuit 61a, a multiplier circuit 61b, and an exponential operator circuit 61c. The subtracter circuit 61a calculates a difference between two energy values $E_{total}(X_q)$ and $E_{total}(X_{q-1})$. The multiplier circuit 61b outputs a product of the difference and a constant K stored in a register (not illustrated). The constant K has a value of $(1/T_q)-(1/T_{q+1})$, which is calculated by the controller device 5, for example. The exponential operator circuit 61c then calculates a probability R of equation (1) from the output of the multiplier circuit 61b by using a natural exponential function.

The probability comparator circuit 62 compares the above probability R with a random value provided from the random signal generator circuit 6. Here the random value is assumed to be greater than zero and smaller than one. When the random number is greater than probability R, the probability comparator circuit 62 outputs a value of one. When the random number is smaller than probability R, the probability comparator circuit 62 outputs a value of zero.

The OR gate 63 performs a logical disjunction of two output values from the energy comparator circuit 60 and probability comparator circuit 62. The result of this operation is a flag signal Flgd.

The second flag generator circuit 51 is similar to the first flag generator circuit 50 described above. Specifically, the second flag generator circuit 51 may be implemented by modifying the first flag generator circuit of FIG. 8 as follows: (a) energy value $E_{total}(X_{q-1})$ is used in place of energy value $E_{total}(X_q)$, (b) energy value $E_{total}(X_q)$ is used in place of energy value $E_{total}(X_{q+1})$, and (c) the flag signal output is not Flgd, but Flgu.

Figure 9:
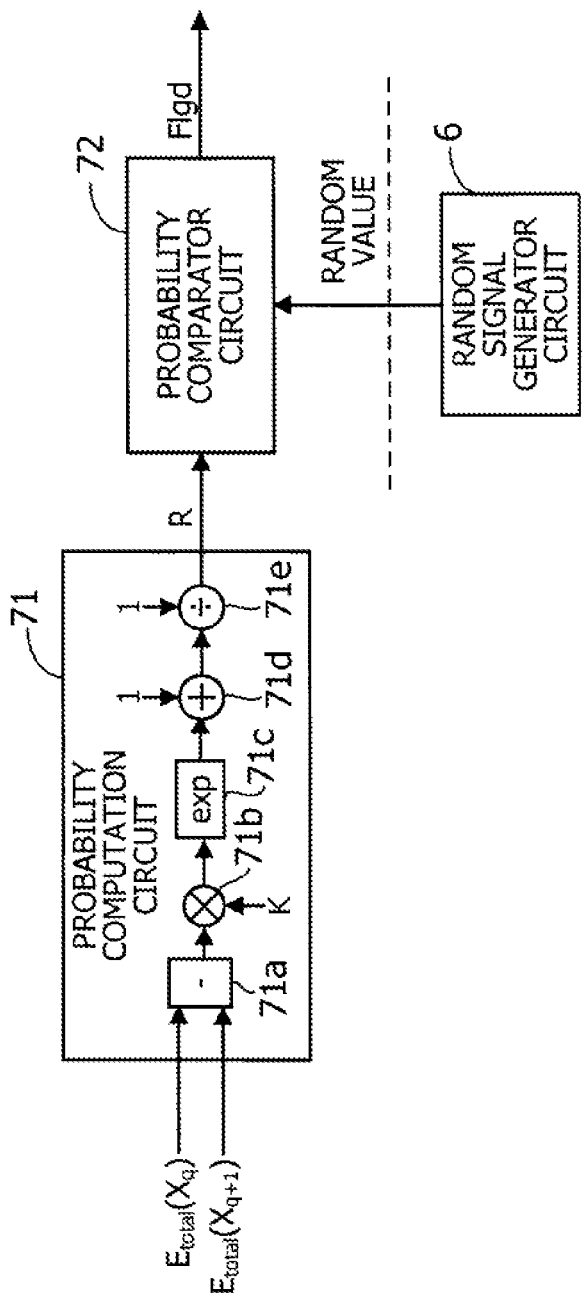
FIG. 9 illustrates another example of a flag generator circuit.

FIG. 9 illustrates another example of a flag generator circuit. Specifically, FIG. 9 illustrates a first flag generator circuit 50a designed to operate according to what is called Heat-Bath algorithm, as an alternative implementation of the first flag generator circuit 50 discussed in FIG. 7. The illustrated circuit structure of the first flag generator circuit 50a may similarly be used to implement the second flag generator circuit 51 in FIG. 7.

The first flag generator circuit 50a is formed from a probability computation circuit 71 and a probability comparator circuit 72. The probability computation circuit 71 calculates a probability R according to equation (7) below. To this end, the probability computation circuit 71 includes a subtracter circuit 71a, a multiplier circuit 71b, an exponential operator circuit 71c, an adder circuit 71d, and a divider circuit 71e.

$$R=1/[1+\exp\{(1/T_q-1/T_{q+1})(E_{total}(X_{q+1})-E_{total}(X_q))\}] \quad (7)$$

The subtracter circuit 71a, multiplier circuit 71b, and exponential operator circuit 71c perform the same computational operations discussed above for the subtracter circuit 61a, multiplier circuit 61b, and exponential operator circuit 61c in FIG. 8. The adder circuit 71d adds one to the result value of the exponential operator circuit 61c. The divider circuit 71e then calculates a reciprocal of the summation result of the adder circuit 71d, thus yielding a probability R of equation (7).

The probability comparator circuit 72 compares the above probability R with a random value from the random signal generator circuit 6. Here the random value is assumed to be greater than zero and smaller than one. When the random number is greater than probability R, the probability comparator circuit 72 outputs a value of one as flag signal Flgd. When the random number is smaller than probability R, the probability comparator circuit 72 outputs a value of zero as flag signal Flgd.

Referring back to FIG. 7, the AND gate 52 performs a logical product operation on two flag signals Flgd and Flgu generated by the first and second flag generator circuits 50 and 51. The result of this operation is referred to as an arbitration signal Arbi. That is, the AND gate 52 asserts the arbitration signal Arbi to one when both flag signals Flgd and Flgu are one. Otherwise, the arbitration signal Arbi is zero.

The exchange circuit 53 receives the flag signals Flgd and Flgu from the first and second flag generator circuits 50 and 51 and the arbitration signal Arbi from the AND gate 52. The exchange circuit 53 also receives n-bit output values $X_{q-1}$, $X_q$, and $X_{q+1}$ from neuron circuits in the (q−1)th, q-th, and (q+1)th Ising devices, respectively. Based on these signals, the exchange circuit 53 generates a new n-bit output value $X_{qnew}$ for use in neuron circuits of the q-th Ising device.

Figure 10:
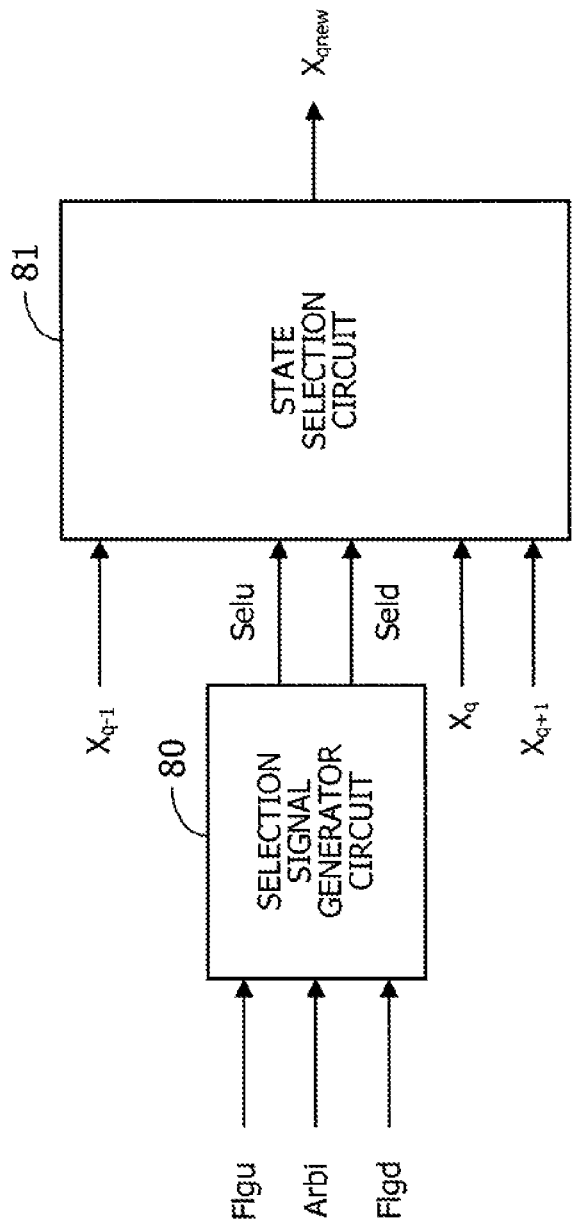
FIG. 10 illustrates an example of an exchange circuit.

FIG. 10 illustrates an example of an exchange circuit. The illustrated exchange circuit 53 includes a selection signal generator circuit 80 and a state selection circuit 81. The selection signal generator circuit 80 outputs two selection signals Selu and Seld according to a truth table seen in FIG. 11, based on the flag signals Flgd and Flgu and the arbitration signal Arbi from the AND gate 52.

FIG. 11 illustrates a truth table that indicates an exemplary relationship between input signals and output signals of a selection signal generator circuit. As the truth table of FIG. 11 indicates, the selection signal generator circuit 80 outputs selection signals Selu=1 and Seld=0 when flag signal Flgu is one while flag signal Flgd and arbitration signal Arbi are zero. The selection signal generator circuit 80 outputs selection signals Selu=0 and Seld=1 when flag signal Flgd is one while flag signal Flgu and arbitration signal Arbi are zero. The selection signal generator circuit 80 outputs selection signals Selu=0 and Seld=0 when flag signals Flgu and Flgd and arbitration signal Arbi are zero. The selection signal generator circuit 80 outputs selection signals Selu=1 and Seld=0 (or Selu=0 and Seld=1) when flag signals Flgu and Flgd and arbitration signal Arbi are one.

Referring back to FIG. 10, the state selection circuit 81 generates a new n-bit output value $X_{qnew}$ for use in neuron circuits of the q-th Ising device, based on selection signals Selu and Seld from the selection signal generator circuit 80. As will be described below, the state selection circuit 81 follows a truth table in FIG. 12.

Figure 12:
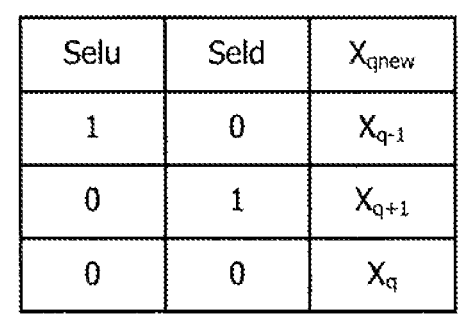

FIG. 12 illustrates a truth table that indicates an exemplary relationship between input signals and output signals of a state selection circuit. As the truth table of FIG. 12 indicates, the state selection circuit 81 selects output value $X_{q-1}$ of the (q−1)th Ising device and outputs it as a new output value $X_{qnew}$ when selection signal Selu is one while selection signal Seld is zero. When this is the case, the q-th and (q−1)th Ising devices exchange their output values $X_q$ and $X_{q-1}$.

The state selection circuit 81 selects output value $X_{q+1}$ of the (q+1)th Ising device and outputs it as a new output value $X_{qnew}$ when selection signal Selu is zero while selection signal Seld is one. When this is the case, the q-th and (q+1)th Ising devices exchange their output values $X_q$ and $X_{q+1}$.

The state selection circuit 81 selects output value $X_q$ of the q-th Ising device and outputs it as an output value $X_{qnew}$ when both selection signals Selu and Seld are zero. When this is the case, no exchange of output values takes place among the (q−1)th, q-th, and (q+1)th Ising devices.

(b4) Exemplary Operation of Information Processing Apparatus According to Second Embodiment With reference to several flowcharts, this subsection describes how the information processing apparatus 1a of FIG. 4 operates under the control of the controller device 5.

Figure 13:
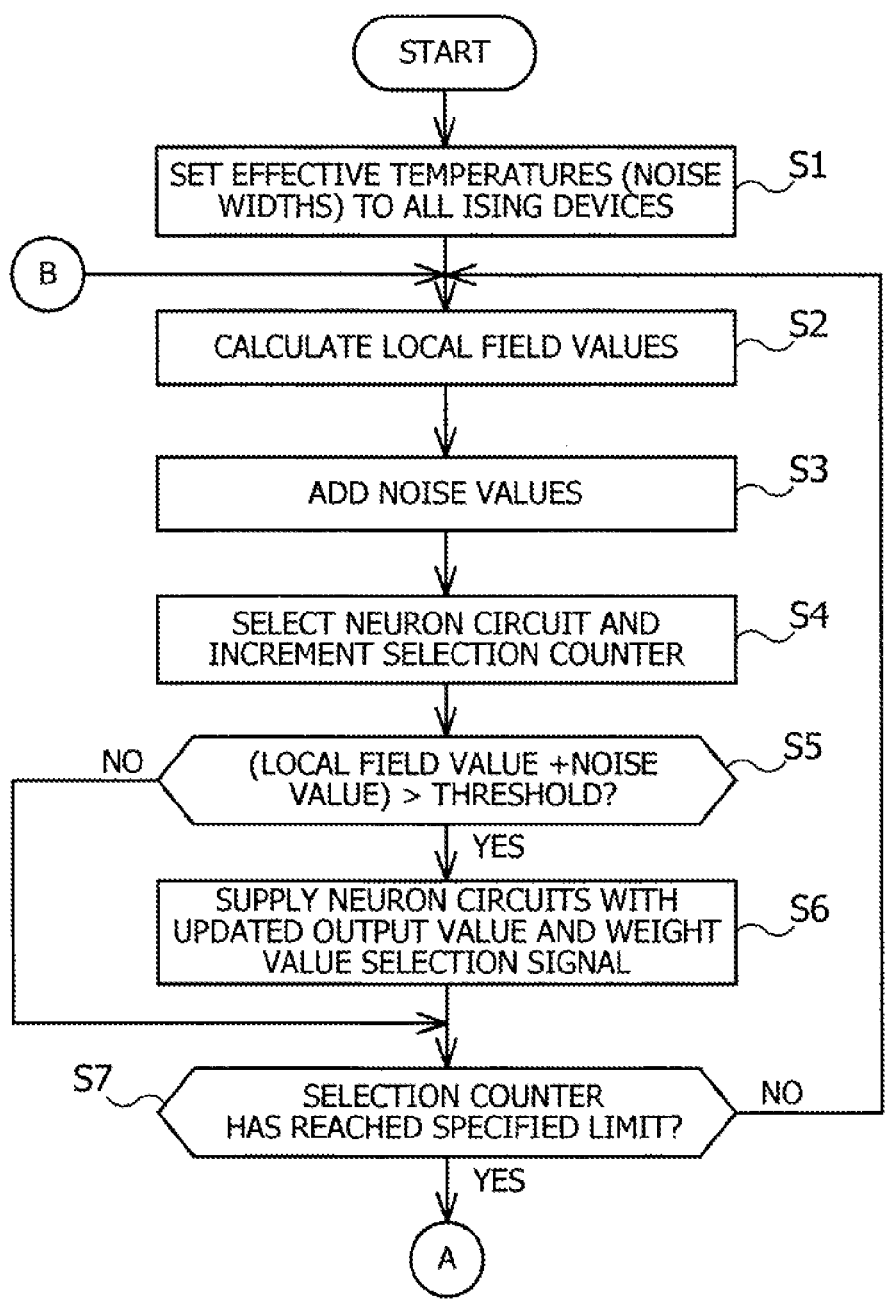
FIGS. 13 and 14 are the first and second parts of a flowchart illustrating exemplary operation of an information processing apparatus according to the second embodiment.
Figure 14:
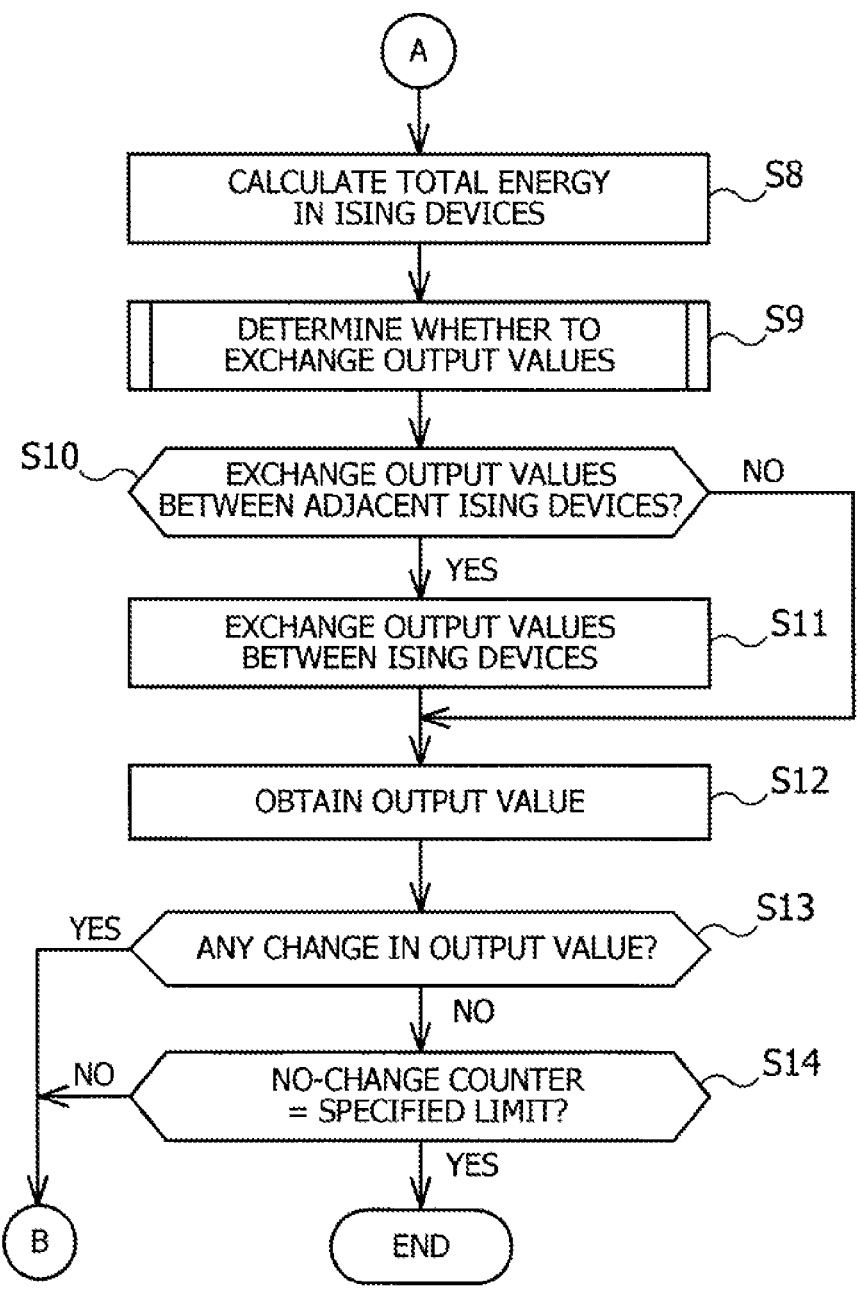

FIGS. 13 and 14 are a flowchart illustrating exemplary operation of the information processing apparatus 1a according to the second embodiment.

(Step S1) Upon receipt of a startup signal from an external source, the controller device 5 configures Ising devices 2b1 to 2bN with different effective temperatures (noise widths).

(Step S2) In each Ising device 2b1 to 2bN, its n neuron circuits (e.g., neuron circuits 1111 to 111n) calculate their respective local field values $h_1$ to $h_n$.

(Step S3) In each Ising device 2b1 to 2bN, its n neuron circuits add noise values to their respective local field values $h_1$ to $h_n$.

(Step S4) Each Ising device 2b1 to 2bN allows one of its n neuron circuits to update its output value. This selection of one neuron circuit depends on a random value supplied from a random signal generator circuit included in each Ising device 2b1 to 2bN (e.g., random signal generator circuit 10f1). The control circuit in each Ising device 2b1 to 2bN (e.g., control circuit 10b1) then increments a selection counter by one to record the selection.

(Step S5) In each Ising device 2b1 to 2bN, the selected neuron circuit determines whether the sum of its own local field value and a noise value exceeds a threshold. When the sum exceeds the threshold, the process advances to step S6. Otherwise, the process skips to step S7.

(Step S6) In each Ising device 2b1 to 2bN, its control circuit (e.g., control circuit 10b1) supplies the n neuron circuits with the updated output value of the selected neuron circuit, as well as with a selection signal for a weight value associated with the selected neuron circuit.

(Step S7) In each Ising device 2b1 to 2bN, its control circuit (e.g., control circuit 10b1) determines whether the selection counter has reached a specified limit. When the specified limit is reached, the process advances to step S8. Otherwise, the process goes back to step S2 to repeat the above steps.

(Step S8) In each Ising device 2b1 to 2bN, its calculation circuit (e.g., calculation circuit 10c1) obtains local field values $h_1$ to $h_n$ and output values from the n neuron circuits. The calculation circuits in the Ising devices 2b1 to 2bN calculate their respective energy values $E_{total}(X_1)$ to $E_{total}(X_N)$. The energy values $E_{total}(X_1)$ to $E_{total}(X_N)$ represent the total amount of energy in the individual Ising devices 2b1 to 2bN.

(Step S9) The exchange control circuits 10d1 to 10dN determine whether to exchange output values. For example, one exchange control circuit 10d1 obtains an energy value $E_{total}(X_1)$ from the calculation circuit 10c1 and an n-bit output value $X_1$ from the control circuit 10b1. The exchange control circuit 10d1 also obtains an energy value $E_{total}(X_2)$ and an n-bit output value $X_2$ from its counterpart exchange control circuit 10d2 in the adjacent Ising device 2b2. The energy value $E_{total}(X_2)$ represents the total amount of energy in the Ising device 2b2. The exchange control circuit 10d1 now calculates an exchange probability on the basis of a difference between the two energy values $E_{total}(X_1)$ and $E_{total}(X_2)$. Then based on this exchange probability, the exchange control circuit 10d1 determines whether to exchange the output values $X_1$ and $X_2$ with each other.

(Step S10) When any two of the exchange control circuits 10d1 to 10dN are to exchange their output values $X_1$ to $X_N$, they advance to step S11, and otherwise skip to step S12.

(Step S11) Since the above step S9 has determined two adjacent Ising devices to exchange output values, the exchange control circuits $10d1$ to $10dN$ in those adjacent Ising devices exchange their n-bit output values (i.e., the outputs of their neuron circuit blocks) with each other.

Suppose, for example, that two Ising devices $2b1$ and $2b2$ are about to exchange their output values. In this case, their exchange control circuits $10d1$ and $10d2$ exchange n-bit outputs $X_1$ and $X_2$ of their neuron circuit blocks $10a1$ and $10a2$ (the latter is not illustrated in FIG. 4). Accordingly, the exchange control circuit $10d1$ supplies $X_2$ to its local neuron circuits $1111$ to $111n$ as a new output value $X_{1new}$ for them.

(Step S12) The control circuit in each Ising device $2b1$ to $2bN$ (e.g., control circuit $10b1$) obtains the n-bit output value from its local neuron circuit block.

(Step S13) Each control circuit determines whether the n-bit output value obtained in step S12 has any change. When there is no change in the n-bit output value, the process advances to step S14. Here the corresponding control circuit increments its no-change counter by one, the counter indicating how many cycles the n-bit output value stays unchanged. When the n-bit output value has a change, the process returns to step S2 to repeat the above steps.

(Step S14) Each control circuit determines whether its no-change counter for n-bit output values has reached a specified limit. When the specified limit is reached, the corresponding control circuit notifies the controller device 5 that the computation in its Ising device has converged. In response, the controller device 5 generates a signal that indicates completion of the computation. When the specified limit is not reached, the process returns to step S2 to repeat the above steps.

The structure and operation of an information processing apparatus $1a$ according to the second embodiment has been described above. The information processing apparatus $1a$ exchanges n-bit output values of Ising devices having adjacent noise widths (or effective temperatures). This exchange happens with an exchange probability of (1, R), under the control of exchange control circuits $10d1$ to $10dN$. The second embodiment provides a hardware-based implementation of the foregoing extended ensemble method, making it possible to reach an optimal solution of a problem in a shorter time. That is, the second embodiment reduces the processing time for solving optimization problems.

The exchange probability is calculated from energy values of neuron circuits, and the energy values are calculated by repeating multiply-accumulate operations of local field values and output values in the individual neuron circuits. It is thus possible to calculate, for example, an energy value $E_{total}(X_1)$ with a simple calculation circuit $10c1$ discussed in FIG. 6.

(c) Third Embodiment

Figure 15:
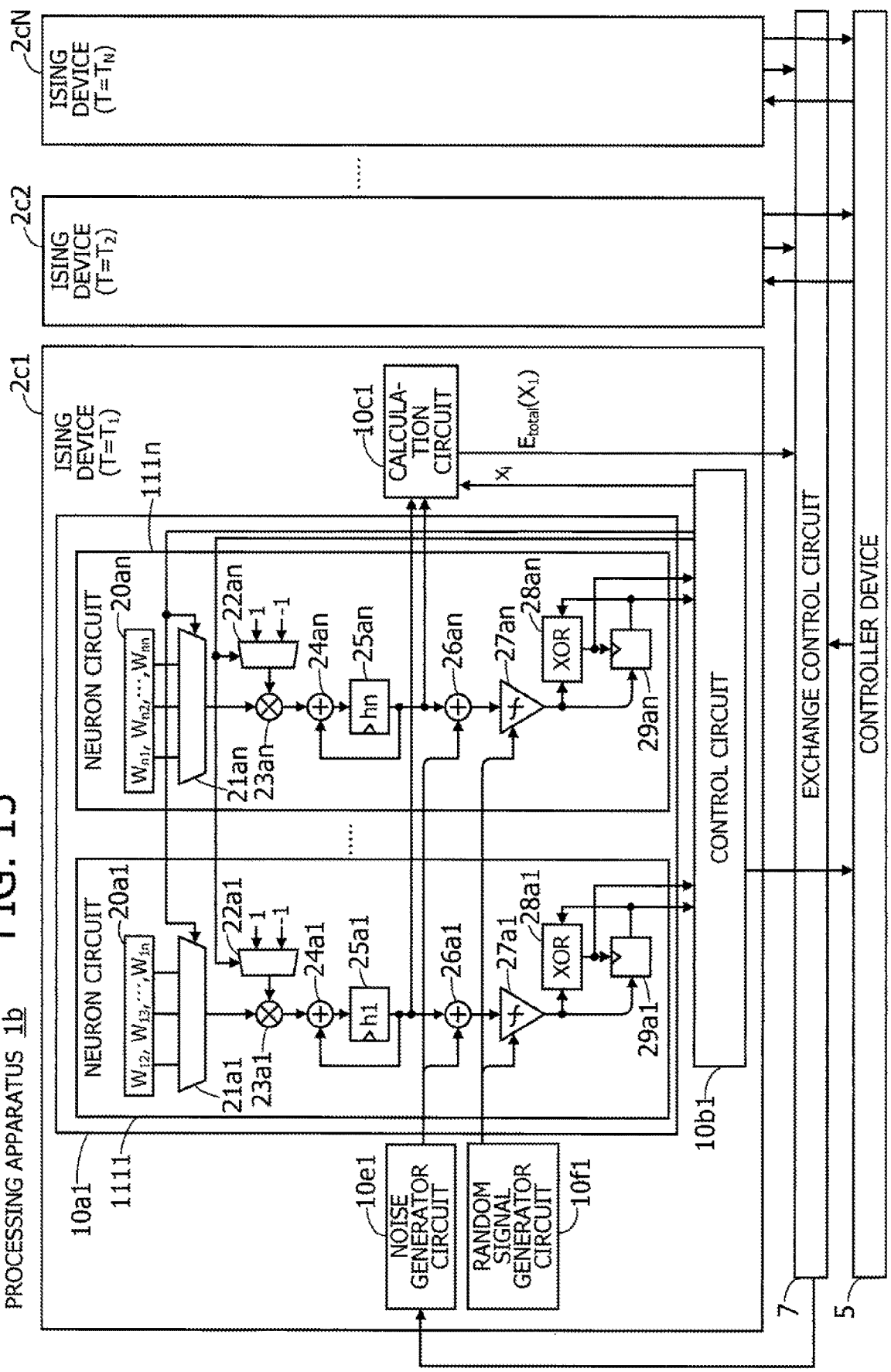
FIG. 15 illustrates an example of an information processing apparatus according to a third embodiment.

FIG. 15 illustrates an example of an information processing apparatus according to a third embodiment. Several elements in this information processing apparatus of FIG. 15 have the same reference numerals as their counterparts in the information processing apparatus $1a$ of FIG. 4.

The illustrated information processing apparatus $1b$ includes Ising devices $2c1$ to $2cN$, a controller device 5, and an exchange control circuit 7. The Ising devices $2c1$ to $2cN$ in FIG. 15 are respectively set up with different effective temperatures T of $T_1, T_2, \ldots,$ and $T_N$. Specifically, the Ising devices $2b1$ to $2bN$ in FIG. 4 are assumed to have successively smaller temperatures as in $T_1 > T_2 > \ldots > T_N$. Since the Ising devices $2c1$ to $2cN$ have the same circuit structure, the following description focuses on one Ising device $2c1$ as a representative example.

The Ising device $2c1$ has a neuron circuit block $10a1$, a control circuit $10b1$, and a calculation circuit $10c1$ similarly to the foregoing Ising device $2b1$ in FIG. 4. The Ising device $2c1$, however, lacks the exchange control circuit $10d1$ discussed in FIG. 4. Instead, a single exchange control circuit 7 is shared by the Ising devices $2c1$ to $2cN$ in this example of FIG. 15. It is not intended, however, to limit the third embodiment to the illustrated configuration. The functions of the exchange control circuit 7 may be implemented wholly or partly in the individual Ising devices $2c1$ to $2cN$.

(c1) Exchange Control Circuit

The exchange control circuit 7 controls the process of exchanging noise widths between two of the Ising devices $2c1$ to $2cN$, where the two Ising devices are set up with adjacent noise widths (or adjacent effective temperatures). An exchange of noise widths happens with a probability based on a difference in the foregoing energy values between the two Ising devices. Such exchanging of noise widths is part of the extended ensemble method described previously.

Figure 16:
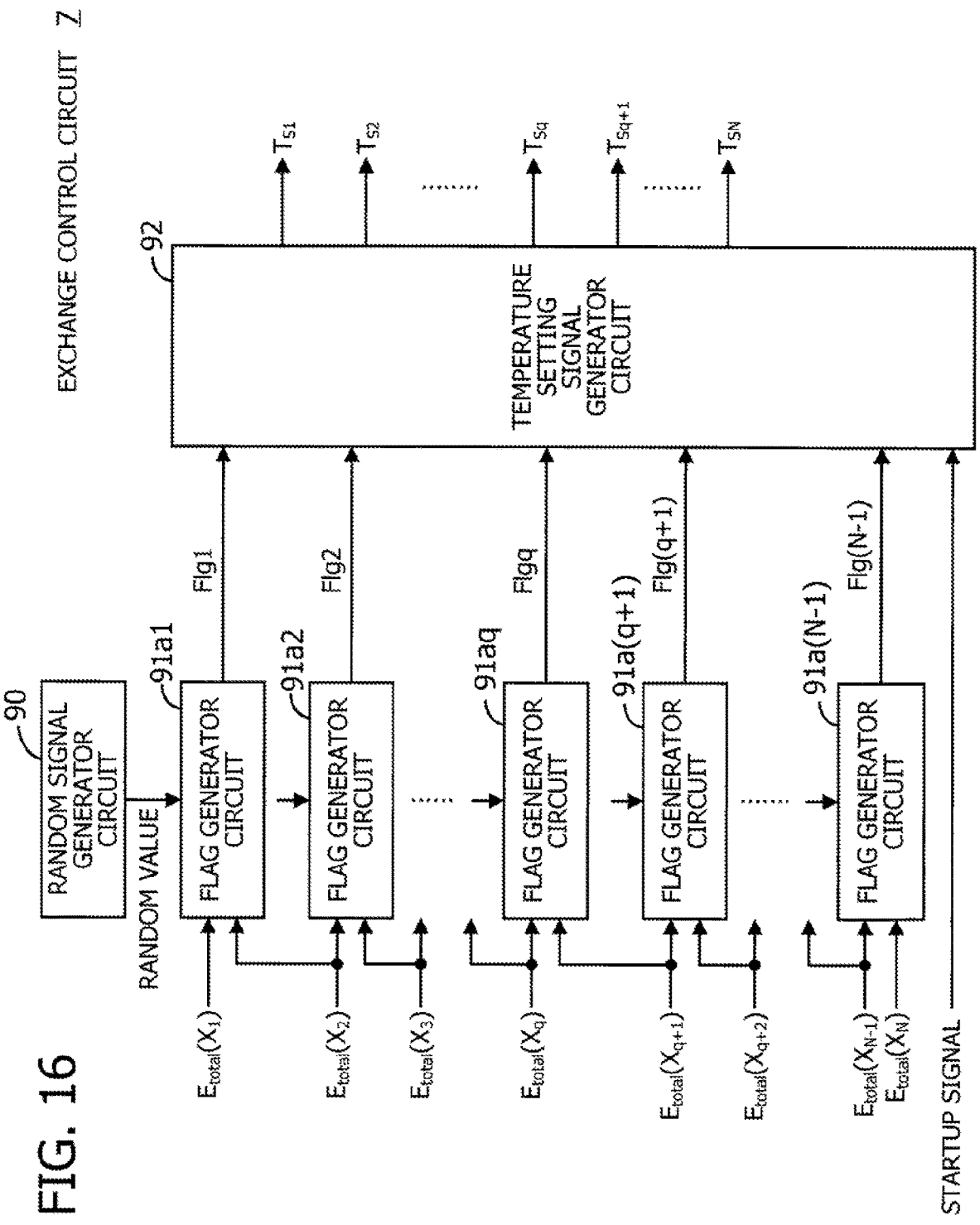
FIG. 16 illustrates an example of an exchange control circuit.

FIG. 16 illustrates an example of an exchange control circuit. This exchange control circuit 7 of FIG. 16 is formed from a random signal generator circuit 90, flag generator circuits $91a1, 91a2, \ldots, 91aq, 91a(q+1), \ldots,$ and $91a(N-1)$, and a temperature setting signal generator circuit 92.

The random signal generator circuit 90 generates random values in the range from zero to one, as in the foregoing random signal generator circuit 6 of the second embodiment.

The flag generator circuits $91a1$ to $91a(N-1)$ in FIG. 16 may be implemented with the same circuit configuration discussed in FIGS. 8 and 9 for the first flag generator circuits 50 and $50a$ in the second embodiment. For example, the q-th flag generator circuit $91aq$ receives an energy value $E_{total}(X_q)$ representing the total amount of energy in the q-th Ising device, as well as an energy value $E_{total}(X_{q+1})$ representing the total amount of energy in the (q+1)th Ising device. The q-th flag generator circuit $91aq$ also receives a random value from the random signal generator circuit 90. Based on the received two energy values $E_{total}(X_q)$ and $E_{total}(X_{q+1})$ and random value, the q-th flag generator circuit $91aq$ generates and outputs a flag signal Flgq. This flag signal Flgq indicates whether to cause the q-th and (q+1)th Ising devices to exchange their noise widths (effective temperatures). Specifically, when flag signal Flgq is one, it means that the two Ising devices are to exchange their noise widths with each other. When flag signal Flgq is zero, it means that no such exchange is to be made.

The (q+1)th flag generator circuit $91a(q+1)$ receives an energy value $E_{total}(X_{q+1})$ representing the total amount of energy in the (q+1)th Ising device, as well as an energy value $E_{total}(X_{q+2})$ representing the total amount of energy in the (q+2)th Ising device. The (q+1)th flag generator circuit $91aq$ also receives a random value from the random signal generator circuit 90. Based on the received two energy values $E_{total}(X_{q+1})$ and $E_{total}(X_{q+2})$ and random value, the (q+1)th flag generator circuit $91a(q+1)$ generates and outputs a flag signal Flg(q+1). This flag signal Flg(q+1) indicates whether to cause the (q+1)th and (q+2)th Ising devices to exchange their noise widths. Specifically, when flag signal Flg(q+1) is one, it means that the two Ising devices are to exchange their noise widths with each other. When flag signal Flg(q+1) is zero, it means that no such exchange is to be made.

The temperature setting signal generator circuit 92 generates temperature setting signals $T_{S1}, T_{S2}, \ldots, T_{Sq}$, $T_{Sq+1}, \ldots$, and $T_{SN}$ for setting noise widths corresponding to effective temperatures. As mentioned earlier, the noise generator circuit included in each Ising device 2c1 to 2cN (e.g., noise generator circuit 10e1) has an amplifier circuit (not illustrated in FIG. 15). A temperature setting signal controls the gain of this amplifier, thereby setting an intended noise width to the corresponding Ising device. For example, temperature setting signal $T_{S1}$ gives a specific noise width to the first Ising device 2c1, and temperature setting signal $T_{S2}$ gives a specific noise width to the second Ising device 2c2.

In operation, the temperature setting signal generator circuit 92 first initializes the noise width of each noise generator circuit in the Ising devices 2c1 to 2cN by controlling temperature setting signals $T_{S1}$ to $T_{SN}$ upon receipt of a startup signal from the controller device 5. These initial noise widths have been specified by the controller device 5, and the temperature setting signal generator circuit 92 holds them in its internal storage. Afterwards, the temperature setting signal generator circuit 92 may exchange noise widths between two of the Ising devices 2c1 to 2cN, based on flag signals Flg1 to Flg(N−1) provided from the flag generator circuits 91a1 to 91a(N−1). Here the two Ising devices are adjacent in terms of the values of noise width.

Figure 17:
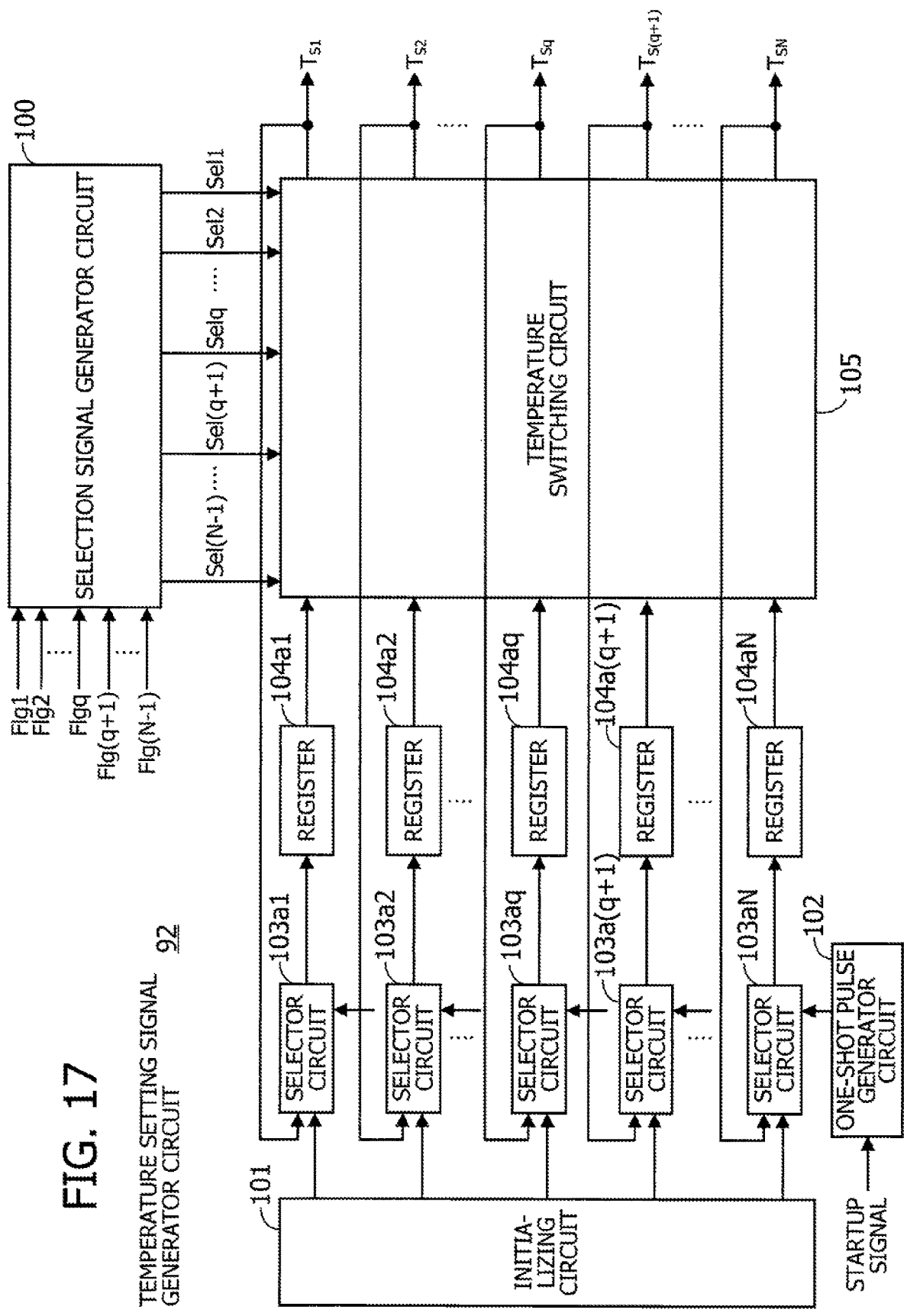
FIG. 17 illustrates an example of a temperature setting signal generator circuit.

FIG. 17 illustrates an example of a temperature setting signal generator circuit. This temperature setting signal generator circuit 92 of FIG. 17 includes, among others, a selection signal generator circuit 100, an initializing circuit 101, a one-shot pulse generator circuit 102, and selector circuits 103a1, 103a2, . . . , 103aq, 103a(q+1), . . . , and 103aN. The temperature setting signal generator circuit 92 further includes registers 104a1, 104a2, . . . , 104aq, 104a(q+1), . . . , and 104aN, and a temperature switching circuit 105.

The selection signal generator circuit 100 outputs selection signals Sel1 to Sel(N−1) according to a truth table seen in FIG. 18, based on flag signals Flg1 to Flg(N−1). FIG. 18 illustrates a truth table that indicates an exemplary relationship between input signals and output signals of a temperature setting signal generator circuit. The symbol "d" in this truth table denotes "don't care" (i.e., its value, zero or one, does not matter).

As seen from the truth table of FIG. 18, the selection signal generator circuit 100 outputs selection signals Sel1=0 to SelN=0 when all input flag signals Flg1 to Flg(N−1) are zero. When flag signal Flg1 is one, the selection signal generator circuit 100 asserts its corresponding selection signal Sel1 to one while making all the other selection signals zero, no matter what values the other flag signals Flg2 to Flg(N−1) may take. When the (q+1)th flag signal Flg(q+1) is one whereas flag signals Flg1 to Flgq are zero, the selection signal generator circuit 100 asserts the (q+1)th selection signal Sel(q+1) to one while making all the other selection signals zero, regardless of the other flag signals.

The initializing circuit 101 holds a plurality of different initial values of noise widths (effective temperatures) for use in the individual Ising devices 2b1 to 2bN. As mentioned above, these initial values are specified by the controller device 5, and the initializing circuit 101 receives and stores them. The initializing circuit 101 provides its stored values for setting initial values of temperature setting signals.

The one-shot pulse generator circuit 102 generates a one-shot pulse signal to selector circuits 103a1 to 103aN in response to a startup signal from the controller device 5.

The selector circuits 103a1 to 103aN select the aforementioned initial values of temperature setting signals from the initializing circuit 101 during the period of the one-shot pulse signal (e.g., when the one-shot pulse signal is at a logical high level). When there is no pulse signal (e.g., when the one-shot pulse signal is at a logical low level), the selector circuits 103a1 to 103aN select the current values of temperature setting signals $T_{S1}$ to $T_{SN}$ of the temperature switching circuit 105.

The registers 104a1 to 104aN receive and store temperature setting signals supplied from their corresponding selector circuits 103a1 to 103aN.

The temperature switching circuit 105 outputs temperature setting signal $T_{S1}$ to $T_{SN}$, based on the foregoing selection signals Sel1 to Sel(N−1) from the selection signal generator circuit 100. Suppose, for example, that flag signals Flg1 to Flg(N−1) are zero when the one-shot pulse signal is at a logical high level. Because every selection signal Sel1 to Sel(N−1) is zero at this point in time, the temperature switching circuit 105 outputs temperature setting signals $T_{S1}$ to $T_{SN}$ carrying initial values for the Ising devices 2c1 to 2cN. Accordingly, the Ising devices 2c1, 2c2, . . . , and 2cN are respectively set up with their initial effective temperatures T of $T_1, T_2, \ldots$, and $T_N$.

The one-shot pulse signal then returns to a logical low level. The selection signals Sel1 to Sel(N−1) may be asserted to one in accordance with the truth table of FIG. 18 during the course of neural computation. When one selection signal is asserted, the temperature switching circuit 105 exchanges noise widths of the corresponding Ising devices 2c1 to 2cN. Suppose, for example, that the q-th selection signal Selq is asserted to one. Then the temperature switching circuit 105 routes the value of temperature setting signal $T_{Sq}$ from the q-th register 104aq to the output of temperature setting signal $T_{Sq+1}$, so that the (q+1)th Ising device will be set up with a noise width corresponding to $T_{Sq}$. The temperature switching circuit 105 also routes the value of temperature setting signal $T_{Sq+1}$ from the (q+1)th register 104a(q+1) to the output of temperature setting signal $T_{Sq}$, so that the q-th Ising device will be set up with a noise width corresponding to $T_{Sq+1}$. This switching action in the temperature switching circuit 105 causes the q-th and (q+1)th Ising devices to exchange their noise widths with each other.

(c2) Exemplary Operation of Information Processing Apparatus According to Third Embodiment With reference to a flowchart of FIG. 19, this subsection describes how the information processing apparatus 1b of FIG. 15 operates under the control of the controller device 5.

FIG. 19 is a flowchart illustrating exemplary operation of an information processing apparatus according to the third embodiment. The proposed information processing apparatus 1b executes steps S1 to S8 discussed in FIGS. 13 and 14 in the same way as the foregoing information processing apparatus 1a does in the second embodiment. For these steps S1 to S8, see the preceding description of FIGS. 13 and 14. The following description thus begins with step S9a in FIG. 19.

(Step S9a) The exchange control circuit 7 determines whether to exchange noise widths. Specifically, the exchange control circuit 7 receives energy values $E_{total}(X_1)$ to $E_{total}(X_N)$ from Ising devices 2c1 to 2cN and calculates a difference in energy value between each two adjacent Ising devices. Then based on exchange probabilities calculated from the differences, the exchange control circuit 7 determines whether to exchange noise widths between any two adjacent Ising devices and which two of the Ising devices 2c1 to 2cN they are.

(Step S10a) When it has determined to exchange noise widths, the exchange control circuit 7 advances to step S11a, and otherwise skips to step S12.

(Step S11a) The exchange control circuit 7 exchanges noise widths between the two adjacent Ising devices that have been determined in step S9a.

The information processing apparatus 1b executes the rest of the process, steps S12 to S14, similarly to the second embodiment.

FIG. 20 is a timing diagram illustrating exemplary operation of the information processing apparatus. Upon power-up of the information processing apparatus 1b (time t1), the controller device 5 is brought to an initial state by a reset signal. The reset signal is then negated (time t2). This allows the controller device 5 to initialize parameters (e.g., weight values and bias values) as well as effective temperatures or noise widths (time t3 to time t4). Then the controller device 5 sends the exchange control circuit 7 a startup signal (time t5). As the startup signal is asserted to a logical high level, the foregoing steps S2 to S14 are executed.

The controller device 5 receives a neuron settlement signal from one of the Ising devices 2c1 to 2cN (time t6). This neuron settlement signal indicates that the n-bit output value of the sending Ising device has settled, meaning that the problem has converged into a solution. In response, the controller device 5 outputs an end signal to indicate the completion of computation while negating the startup signal to a logical low level (time t7).

The above operation discussed in FIG. 20 is also valid for the second embodiment. In other words, the foregoing information processing apparatus 1a may also operate almost similarly.

The structure and operation of an information processing apparatus 1b according to the third embodiment has been described above. The information processing apparatus 1b has an exchange control circuit 7 to exchange noise widths (effective temperatures) between two adjacent Ising devices, with an exchange probability of (1, R). The third embodiment provides a hardware-based implementation of an extended ensemble method, making it possible to reach an optimal solution of a problem in a shorter time. That is, the third embodiment reduces the processing time for solving optimization problems.

The information processing apparatus 1b of the third embodiment exchanges noise widths, whereas the information processing apparatus 1a of the second embodiment exchange n-bit output values generated by n neuron circuits. This means that the third embodiment reduces the amount of data to be exchanged.

The above embodiments have demonstrated one aspect of features that are provided by the proposed information processing apparatuses, Ising devices, and control method for controlling an information processing apparatus. It is noted, however, that what have been described above are only for illustrative purposes. It not intended to limit the scope by the described examples. For instance, the foregoing neuron circuit block is not limited to the one based on the DeGloria algorithm illustrated in FIG. 4 or other drawings. Rather, a neuron circuit block may be implemented in a different way, as long as it calculates local field values (i.e., energy of neurons) from n-bit output values from n neurons and their corresponding weight values.

Several examples of an information processing apparatus, an Ising device, and a control method have been discussed above. In one aspect, the proposed techniques contribute to reduction of computation time.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a plurality of Ising devices that respectively calculate identical optimization problems in an independent manner, the plurality of Ising devices each including a neuron circuit block that calculates as many first energy values as a number of neurons, based on weight values representing strengths of neuron-to-neuron connections and output values of the neurons, and determines and outputs new output values, based on comparison results between a threshold and each of the first energy values plus a noise value, the plurality of Ising devices having an equal condition about neuron-to-neuron connections by having a same set of the weight values, the plurality of Ising devices being set up with different noise widths each representing a difference between a lower limit and an upper limit of noise values;
a calculation circuit that calculates second energy values respectively representing total energies of each of the plurality of Ising devices, based on the first energy values and the output values;
an exchange control circuit that exchanges output values or noise widths between a first Ising device and a second Ising device among the plurality of Ising devices, with an exchange probability based on a difference in the second energy values between the first Ising device and the second Ising device, the first and second Ising devices respectively having first and second noise widths, the second noise width being adjacent to the first noise width; and
a controller that sets the different noise widths for the plurality of Ising devices.

2. The information processing apparatus according to claim 1, wherein the calculation circuit performs multiply-accumulate operations between the first energy values and the output values and outputs a result of the multiply-accumulate operations as one of the second energy values.

3. The information processing apparatus according to claim 1, wherein:
the second noise width is larger than the first noise width; and
the exchange control circuit exchanges the output values or noise widths between the first Ising device and the second Ising device when the second Ising device has a smaller second energy value than a second energy value of the first Ising device.

4. The information processing apparatus according to claim 3, wherein the exchange control circuit exchanges the output values or noise widths between the first Ising device and the second Ising device, when the second Ising device has a larger second energy value than the first Ising device, and when the exchange probability is smaller than a random value between zero and one.

5. An Ising device comprising:
a neuron circuit block that calculates as many first energy values as a number of neurons, based on weight values representing strengths of neuron-to-neuron connections and output values of the neurons, and determines and outputs new output values, based on comparison results between a threshold and each of the first energy values plus a noise value assigned to the Ising device, the noise value being variable within a first noise width that represents a difference between a lower limit and an upper limit of the noise value;
a calculation circuit that calculates a second energy value representing a total energy of the Ising device, based on the first energy values and the output values; and
an exchange control circuit that receives a third energy value representing a total energy of another Ising device having a second noise width adjacent to the first noise width and exchanges output values or noise widths between the Ising device and the another Ising device, with an exchange probability based on a difference between the second energy value and the third energy value, the second noise width representing a difference between a lower limit and an upper limit of a noise value used in the another Ising device, the Ising device and the another Ising device respectively calculating identical optimization problems in an independent manner and having an equal condition about neuron-to-neuron connections by having a same set of the weight values.

6. A method of controlling an information processing apparatus, the method comprising:
setting, by a controller in the information processing apparatus, different noise widths respectively for a plurality of Ising devices in the information processing apparatus, the noise widths each representing a difference between a lower limit and an upper limit of noise values, the plurality of Ising devices respectively calculating identical optimization problems in an independent manner, the plurality of Ising devices each including a neuron circuit block that calculates as many first energy values as a number of neurons, based on weight values representing strengths of neuron-to-neuron connections and output values of the neurons, and determines and outputs new output values, based on comparison results between a threshold and each of the first energy values plus a noise value, the plurality of Ising devices having an equal condition about neuron-to-neuron connections by having a same set of the weight values;
calculating, by a calculation circuit in the information processing apparatus, second energy values respectively representing total energies of each of the plurality of Ising devices, based on the first energy values and the output values; and
exchanging, by an exchange control circuit in the information processing apparatus, output values or noise widths between a first Ising device and a second Ising device among the plurality of Ising devices, with an exchange probability based on a difference in the second energy values between the first Ising device and the second Ising device, the first and second Ising devices respectively having first and second noise widths, the second noise width being adjacent to the first noise width.

7. The information processing apparatus according to claim 1, wherein
the plurality of Ising devices are configured to calculate the identical optimization problems respectively by using an energy function in an Ising model, and
the calculation circuit is configured to calculate the second energy values respectively representing energy values of the energy function in the Ising model.

* * * * *